(12) United States Patent
Deng et al.

(10) Patent No.: US 11,669,746 B2
(45) Date of Patent: Jun. 6, 2023

(54) SYSTEM AND METHOD FOR ACTIVE MACHINE LEARNING

(71) Applicant: Samsung Electronics Co., Ltd., Suwon-si (KR)

(72) Inventors: Yue Deng, Sunnyvale, CA (US); Yilin Shen, Santa Clara, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1104 days.

(21) Appl. No.: 16/370,542

(22) Filed: Mar. 29, 2019

(65) Prior Publication Data

US 2019/0318261 A1 Oct. 17, 2019

Related U.S. Application Data

(60) Provisional application No. 62/656,210, filed on Apr. 11, 2018.

(51) Int. Cl.
   *G06N 3/08* (2023.01)
   *G06N 3/088* (2023.01)
   (Continued)

(52) U.S. Cl.
   CPC .......... *G06N 3/088* (2013.01); *G06F 18/214* (2023.01); *G06F 18/22* (2023.01); *G06N 20/00* (2019.01);
   (Continued)

(58) Field of Classification Search
   CPC .......... G05D 1/0257; G06F 16/24568; G06F 16/24578; G06F 16/3347; G06F 16/35; G06F 40/30; G06F 16/358; G06F 16/58; G06F 18/21375; G06F 18/2431; G06K 9/6215; G06K 9/6232; G06K 9/6256; G06K 9/629; G06K 9/6267; G06N 3/0445; G06N 3/0454; G06N 3/088; G06N 5/025; G06N 5/04; G06N 7/005; G06N 20/00; G06N 20/10; G06N 3/08; G06N 3/045;
   (Continued)

(56) References Cited

U.S. PATENT DOCUMENTS 6,016,384 A    1/2000  Gallo
7,792,353 B2 * 9/2010  Forman .................. G06N 20/00
                                                382/224

(Continued)

FOREIGN PATENT DOCUMENTS

JP    H07-101440 B2    11/1995
JP    2015-069580 A     4/2015

OTHER PUBLICATIONS

Yuchen Guo et al., "Active Learning with Cross-Class Similarity Transfer", Proceedings of the Thirty-First AAAI Conference on Artificial Intelligence (AAAI-17), Feb. 10, 2017, p. 1338-1344.

(Continued)

*Primary Examiner* — Gerald Gauthier

(57) ABSTRACT

An electronic device for active learning includes at least one memory and at least one processor coupled to the at least one memory. The at least one processor is configured to select one or more entries from a data set including unlabeled data based on a similarity between the one or more entries and labeled data. The at least one processor is further configured to cause the one or more entries to be labeled.

25 Claims, 13 Drawing Sheets

(51) Int. Cl.
  *G06N 20/00* (2019.01)
  *G06F 18/22* (2023.01)
  *G06F 18/214* (2023.01)
  *G06V 10/77* (2022.01)
  *G06V 10/774* (2022.01)
  *G06V 10/82* (2022.01)
  *G06V 20/70* (2022.01)

(52) U.S. Cl.
  CPC ........ *G06V 10/774* (2022.01); *G06V 10/7715* (2022.01); *G06V 10/82* (2022.01); *G06V 20/70* (2022.01)

(58) Field of Classification Search
  CPC .......... G06N 3/084; G06N 7/00; G06N 7/01; G06V 10/82; G06V 10/454; G10L 15/1822; G06T 7/246; G06T 7/292; H04L 63/0227; H04L 67/10; B07C 5/3425
  USPC .............................. 382/159; 704/244; 706/12
  See application file for complete search history.

(56) References Cited

U.S. PATENT DOCUMENTS

| | | | | |
|---|---|---|---|---|
| 8,010,357 | B2* | 8/2011 | Hakkani-Tur | G10L 15/1822 704/10 |
| 9,460,390 | B1* | 10/2016 | Lin | G06N 7/01 |
| 9,483,287 | B2 | 11/2016 | Scheerer et al. | |
| 9,652,720 | B2 | 5/2017 | Vasseur et al. | |
| 10,565,518 | B2* | 2/2020 | Jin | G06N 20/00 |
| 2008/0103996 | A1* | 5/2008 | Forman | G06N 20/00 706/12 |
| 2008/0281764 | A1* | 11/2008 | Baxter | G06N 20/00 706/12 |
| 2010/0023465 | A1* | 1/2010 | Kuroiwa | G06N 20/00 706/47 |
| 2010/0250473 | A1* | 9/2010 | Porikli | G06N 20/10 706/20 |
| 2011/0010319 | A1* | 1/2011 | Harada | G06F 16/58 706/12 |
| 2012/0095943 | A1* | 4/2012 | Yankov | G06N 20/00 706/12 |
| 2012/0284791 | A1* | 11/2012 | Miller | G06N 20/00 726/22 |
| 2013/0097103 | A1* | 4/2013 | Chari | G06N 20/10 707/E17.089 |
| 2013/0218817 | A1* | 8/2013 | Vashist | G06N 5/025 706/12 |
| 2014/0188769 | A1* | 7/2014 | Lim | G06F 16/24578 706/12 |
| 2014/0337005 | A1* | 11/2014 | Abdel-Hady | G06F 16/35 704/2 |
| 2015/0134578 | A1 | 5/2015 | Tamatsu et al. | |
| 2016/0026913 | A1 | 1/2016 | Moon et al. | |
| 2016/0275411 | A1* | 9/2016 | Kim | G06F 16/24568 |
| 2017/0123428 | A1* | 5/2017 | Levinson | G05D 1/0257 |
| 2017/0132510 | A1* | 5/2017 | Paluri | H04L 67/10 |
| 2017/0278135 | A1 | 9/2017 | Majumdar et al. | |
| 2018/0032793 | A1 | 2/2018 | Han et al. | |
| 2018/0137642 | A1 | 5/2018 | Malisiewicz et al. | |
| 2018/0307745 | A1* | 10/2018 | Bachrach | G06N 3/084 |
| 2018/0314982 | A1* | 11/2018 | Gopalan | G06N 20/00 |
| 2019/0017374 | A1* | 1/2019 | Misra | G06N 3/045 |
| 2019/0050368 | A1* | 2/2019 | Chen | G06F 18/21375 |
| 2019/0095788 | A1* | 3/2019 | Yazdani | G06N 3/084 |
| 2019/0147125 | A1* | 5/2019 | Yu | G06N 7/00 703/10 |
| 2019/0155947 | A1* | 5/2019 | Chu | G06F 16/358 |
| 2019/0188212 | A1* | 6/2019 | Miller | G06N 20/10 |
| 2019/0244138 | A1* | 8/2019 | Bhowmick | G06N 3/045 |
| 2019/0318261 | A1* | 10/2019 | Deng | G06V 10/82 |
| 2020/0273180 | A1* | 8/2020 | Kaufmann | G06T 7/292 |
| 2020/0285906 | A1* | 9/2020 | Do | G06F 18/2431 |
| 2020/0338599 | A1* | 10/2020 | Shniberg | B07C 5/3425 |

OTHER PUBLICATIONS

Yue Deng et al., "Adversarial Active Learning for Sequence Labeling and Generation", Proceedings of Twenty-Seventh International Joint Conference on Artificial Intelligence (IJCAI-18), Jul. 13-19, 2018, p. 4012-4018.
Notification of Transmittal of the International Search Report and the Written Opinion of the International Searching Authority, or the Declaration dated Jul. 29, 2019 in connection with International Patent Application No. PCT/KR2019/004347, 10 pages.

* cited by examiner

NSE: a man in a suit and tie
ALISE: a man in a suit and tie standing next to a wall
ALISE+NSE: a man in business casual garb looks NSE: a *woman* sitting at a table with a plate of food
ALISE: a little girl sitting at a table with a plate of food
ALISE+NSE: a little girl sitting at a table with a piece of cake on it NSE: a couple of bags are on the floor
ALISE: a large amount of luggage is sitting on the floor
ALISE+NSE: a couple of bags of luggage sitting on top of a floor NSE: a large air plane flying through the air
ALISE: a large air plane flying through the air
ALISE+NSE: a large passenger jet flying through a blue sky NSE: a man is standing in the snow on skis
ALISE: a man standing on the side of a ski slope
ALISE+NSE: a man standing in the snow on skis next to a stop sign

SYSTEM AND METHOD FOR ACTIVE MACHINE LEARNING

CROSS-REFERENCE TO RELATED APPLICATION AND CLAIM OF PRIORITY

This application claims priority under 35 U.S.C. § 119(e) to U.S. Provisional Patent Application No. 62/656,210 filed on Apr. 11, 2018 and entitled "A Method and System for Improving Artificial Intelligence Using Adversarial Active Learning AI." This provisional patent application is hereby incorporated by reference in its entirety.

TECHNICAL FIELD

This disclosure relates generally to machine learning systems. More specifically, this disclosure relates to a system and method for active machine learning.

BACKGROUND

Active learning (AL) is an approach to solve supervised learning problems without sufficient labels. While there have been active learning solutions proposed for classification problems, active learning algorithms for sequences are still not widely discussed. With the growing interest in artificial intelligence, many newly-emerging problems are defined in the scope of sequence learning, including image captioning, machine translation, and natural language understanding. Compared with classification tasks that only need one label for a sample, sequence learning tasks often require a series of token-level labels for a whole sequence. Precise annotations for sequences are not only labor-consuming but may also require very specific domain knowledge that is not easily accomplished by crowd-sourcing workers.

SUMMARY

This disclosure provides a system and method for active machine learning.

In a first embodiment, a method for active learning includes selecting one or more entries from a data set including unlabeled data based on a similarity between the one or more entries and labeled data. In addition, the method includes causing the one or more entries to be labeled.

In a second embodiment, an electronic device for active learning includes at least one memory and at least one processor coupled to the at least one memory. The at least one processor is configured to select one or more entries from a data set including unlabeled data based on a similarity between the one or more entries and labeled data. The at least one processor is further configured to cause the one or more entries to be labeled.

In a third embodiment, a non-transitory computer readable medium embodies a computer program for operating an electronic device including at least one processor. The computer program includes computer readable instructions that, when executed by the at least one processor, cause the electronic device to select one or more entries from a data set including unlabeled data based on a similarity between the one or more entries and labeled data. The computer program further includes computer readable instructions that, when executed by the at least one processor, cause the electronic device to cause the one or more entries to be labeled.

In a fourth embodiment, a method for training an active learning model includes receiving a data pool including labeled data and unlabeled data. The method also includes mapping, by a feature encoder, the labeled data and the unlabeled data to a latent space. In addition, the method includes processing the mapped labeled data and the mapped unlabeled data by a discriminator, where the discriminator is configured to distinguish unlabeled data from labeled data.

In a fifth embodiment, an electronic device for training an active learning model includes at least one memory and at least one processor coupled to the at least one memory. The at least one processor is configured to perform the method of the fourth aspect or any of its dependent claims. In a sixth embodiment, a non-transitory computer readable medium contains computer readable program code that, when executed, causes at least one processor to perform the method of the fourth aspect or any of its dependent claims.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 11E, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure.

Existing active learning strategies rely on uncertainty measures derived from a classifier for query sample selection. These active learning algorithms are not easily extended to solving sequence learning problems due to the complexity of the label space. Consider a label sequence with p tokens, where each token can belong to k possible classes. Given that, there are $k^p$ possible combinations of the label sequence. This complexity can grow exponentially with the length of the output.

There are two major challenges faced by existing active learning approaches in handling sequence learning tasks: (i) the "cold-start" problem and (ii) the "label-sampling dilemma." The cold-start problem is mainly due to the complexity of the learning system for structured prediction. Unlike classification tasks that just use a simple probabilistic classifier, predictors for sequences are configured within a complex recurrent structure, such as a long short-term memory structure. Training a structured predictor with very limited labeled sequences can easily lead to a biased estimation. The cold-start problem occurs during the initial steps of active learning when there are insufficient labeled samples. The label-sampling dilemma is attributed to the inability to perform a full enumeration of all possible sequence labels. More specifically, when calculating an uncertainty score such as entropy for a sequence, all possible label combinations should be taken into account, which becomes impractical when the output sequences are too long. Therefore, approximated uncertainty measures can be used as a surrogate for sequence-based active learning.

To overcome these or other limitations, embodiments of this disclosure provide a new active learning framework for sequences based on adversarial learning. Example embodiments described below help to alleviate the demands on a structured predictor for query sample selection. In some embodiments, the adversarial active learning framework incorporates a neural network to explicitly assert each sample's informativeness with regard to labeled data. An induced active score avoids heavy computations in sampling the label space and can significantly improve the active learning efficiency, particularly on large datasets.

Figure 1:
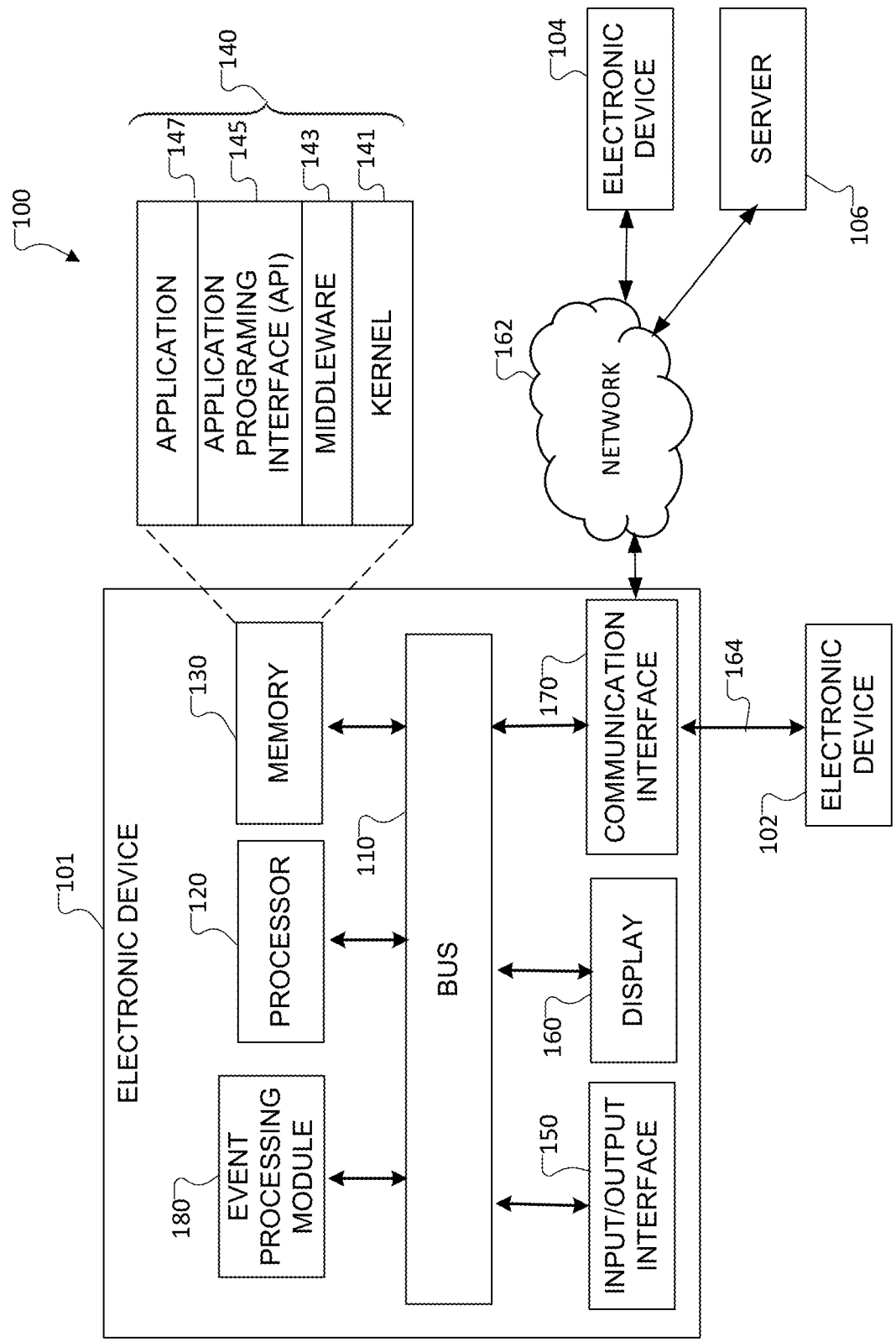
FIG. 1 illustrates an example network configuration in accordance with various embodiments of this disclosure.

FIG. 1 illustrates an example network configuration 100 in accordance with various embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network environment 100. The electronic device 101 can include at least one of a bus 110, a processor 120, a memory 130, an input/output (IO) interface 150, a display 160, a communication interface 170, or an event processing module 180. In some embodiments, the electronic device 101 may exclude at least one of the components or may add another component.

The bus 110 includes a circuit for connecting the components 120 to 180 with one another and transferring communications (such as control messages and/or data) between the components. The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor can be a graphics processor unit (GPU). In accordance with various embodiments of this disclosure, the processor 120 can receive unlabeled input data, map the unlabeled input data to a latent space to provide a latent representation of the input data, process the latent representation to distinguish the unlabeled input data from labeled data, and output a score indicating the informativeness of the unlabeled data and the similarity of the unlabeled data to labeled data. The processor 120 can also provide prompts to request and receive one or more labels for the unlabeled data based on the score.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or a memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 can include an application that receives input data from a user to be labeled to provide services to the user such as virtual assistant services including voice recognition and suggestions services, image recognition services, or other services. The application 147 can further include machine learning applications for labeling data or classifying data as needing to be labeled by various processes described in this disclosure.

The middleware 143 can function as a relay to allow the API 145 or the application 147 to communicate data with the kernel 141, for example. A plurality of applications 147 can be provided. The middleware 143 is able to control work requests received from the applications 147, for example, by allocating the priority of using the system resources of the electronic device 101 (such as the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (such as a command) for filing control, window control, image processing or text control.

The IO interface 150 serves as an interface that can, for example, transfer commands or data input from a user or other external devices to other component(s) of the electronic device 101. Further, the IO interface 150 can output commands or data received from other component(s) of the electronic device 101 to the user or the other external device.

The display 160 may include, for example, a liquid crystal display (LCD), a light emitting diode (LED) display, an organic light emitting diode (OLED) display, a quantum light emitting diode (QLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as signals received by the communication interface 170 regarding sequence labeling inputs, requests, suggestions, or submissions, or other signals.

The electronic device 101 further includes one or more sensors that can meter a physical quantity or detect an activation state of the electronic device 101 and convert metered or detected information into an electrical signal. For example, a sensor can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) can further include a control circuit for controlling at least one of the sensors included therein. Any of these sensor(s) can be located within the electronic device 101.

The wireless communication is able to use at least one of, for example, long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function, according to embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. The server 106 can also include an event processing module (not shown) that may support the event processing module 180 implemented in the electronic device 101. For example, the event processing module 180 can process at least a part of information obtained from other elements (such as the processor 120, the memory 130, the input/output interface 150, or the communication interface 170) and can provide the same to the user in various manners.

While in FIG. 1 the event processing module 180 is shown to be a module separate from the processor 120, at least a portion of the event processing module 180 can be included or implemented in the processor 120 or at least one other module, or the overall function of the event processing module 180 can be included or implemented in the processor 120 or another processor. The event processing module 180 can perform operations according to embodiments of this disclosure in interoperation with at least one program 140 stored in the memory 130.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
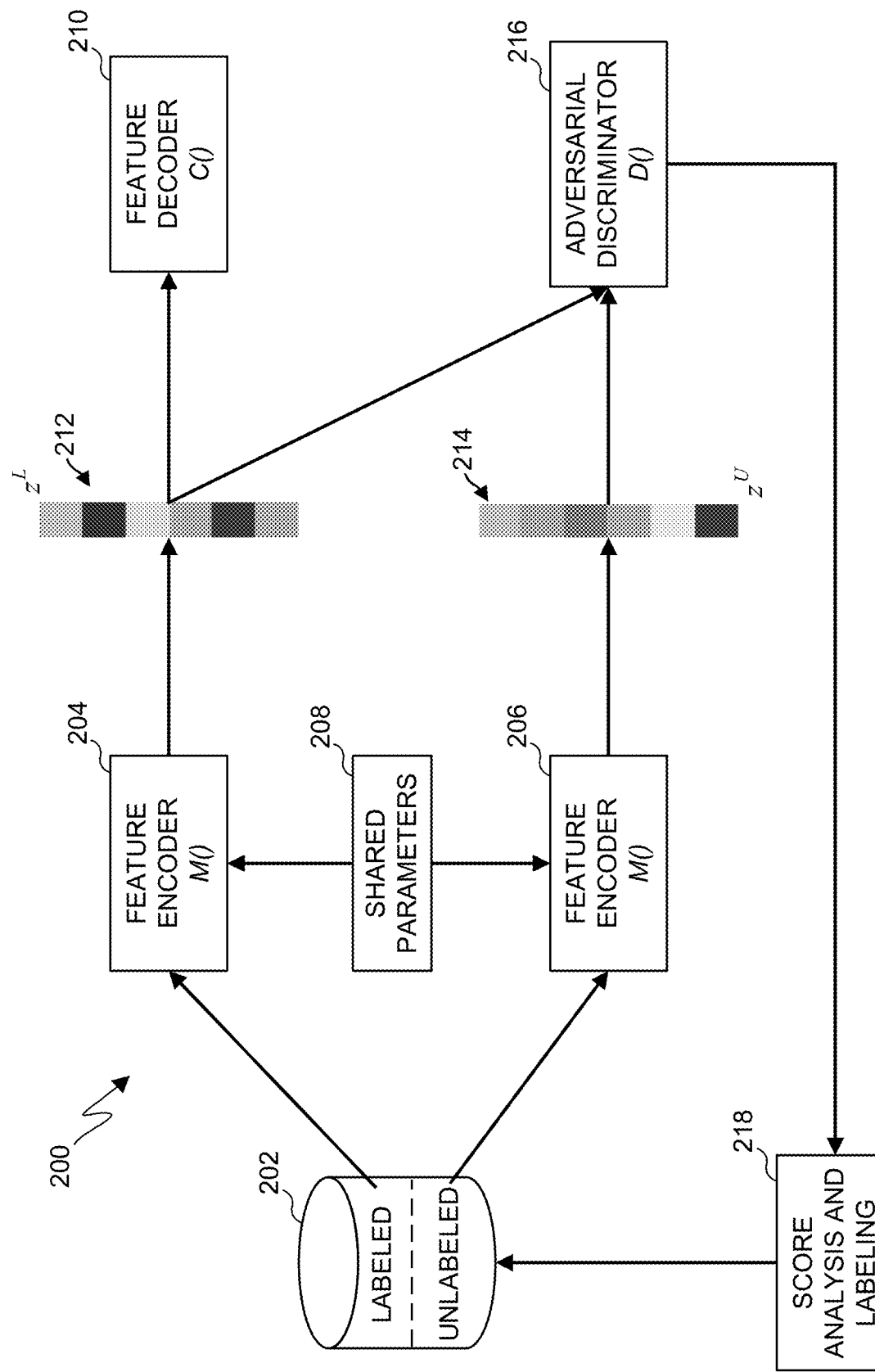
FIG. 2 illustrates an example active machine learning training model in accordance with various embodiments of this disclosure.

FIG. 2 illustrates an example active machine learning training model 200 in accordance with various embodiments of this disclosure. For ease of explanation, the training model 200 may be described as being executed or otherwise used by the processor(s) 120 of any of the electronic devices 101, 102, 104 or the server 106 in FIG. 1. However, the active machine learning training model 200 may be used by any suitable device(s) and in any suitable system.

As shown in FIG. 2, the model 200 is configured to retrieve data from a data store 202, such as by retrieving a selection of training data from logged data. The logged data may represent data gained from performing sequence encoding and decoding using an encoder-decoder framework for labeling data, such as from a long short-term memory (LSTM) encoder-decoder, a recurrent neural network (RNN) encoder-decoder, or other encoder-decoder framework used for purposes such as natural language understanding and slot filling, image recognition, image captioning, or other purposes. The labeling of the labeled data can thus be considered reliable and retrieved from the data store 202 for training purposes. The data store 202 also includes unlabeled data. The unlabeled data can correspond to the labeled data in the data store 202, such as when representing data received before labeling of the data occurred. The unlabeled data can also represent other unlabeled data that has been received and stored in the data store 202 and that is not necessarily related to the labeled data in the data store 202.

The model 200 includes a first feature encoder 204 and a second feature encoder 206. The first feature encoder 204 and the second feature encoder 206 include shared parameters 208 such that, in some embodiments, the first feature encoder 204 and the second feature encoder 206 are configured in the same manner. The model 200 also includes a feature decoder 210 that corresponds to the first feature encoder 204 and that is used to decode encoded inputs from the first feature encoder 204. The feature encoders 204, 206 and the feature decoder 210 can be configured for feature encoding and decoding based on the types of data to be processed and the target outputs. For example, the model 200 can be used for natural language understanding and slot filling, image recognition, image captioning, or other purposes, and the feature encoders 204, 206 and the feature decoder 210 can be configured based on the types of data to be processed in each of these applications. As a particular example, the feature encoders 204, 206 and the feature decoder 210 can be configured as a convolutional neural network for image data, an LSTM or RNN network for speech and text, or other encoder-decoder configurations for other types of data.

The first feature encoder 204 is configured to receive, from the data store 202, labeled samples and to map the labeled samples to a latent representation. As used below, $(x^L, y^L) \sim (X^L, Y^L)$ denote a pair of labeled samples. Here, $x^L$ is input data that can be of any type (such as images, speech, text, or other data types) depending on the learning task to be performed by the model 200. Also, $y^L$ is a targeted output sequence composed of p tokens such that $y^L = \{y_1^L \ldots, y_p^L\}$. The functions performed by the feature encoders 204 and 206 are denoted as M( ). The first feature encoder 204 receives the input $x^L$ and maps the input to a first latent representation 212 ($z^L$) such that $z^L = M(x^L)$. In some embodiments, the feature decoder 210 accepts the first latent representation 212 as a conditional input and sequentially predicts each token in $y^P$ as follows:

$$P(y^P = \{y_1^P \ldots y_q^P\} \mid x) = P(y_1^P \mid z^L = M(x^L)) \prod_{t=1}^{T} P(y_T^P \mid y_1^P \ldots y_{t-1}^P, z^L) \quad (1)$$

Also, in some embodiments, a generative probability is modeled by an RNN, such as an LSTM. The first latent representation 212 can be used as the starting key at step zero, and the decoder 210 outputs each token $y_t$ based on the input of the $t^{th}$ step and the memory vector maintained by the RNN. The training loss of the sequence learning process is obtained by counting the differences between the predicted sequence $y^P$ and the ground truth labels $y^L$ as follows:

$$L_S(X^L, Y^L) = \Sigma_{(x^L, y^L) \sim (X^L, Y^L)} L(y^L, y^P) \quad (2)$$

Here, $y^L$ is the labeled sequence, and the predicted sequence $y^P$ is generated by a function of $x^L$ as shown in Equation (1). Also, L can represent arbitrary losses defined over two sequences, such as the prevalent cross-entropy. The feature decoder 210 thus provides for a set of target output data for the labeled data.

The unlabeled data from the data store 202 is provided to the second feature encoder 206, which maps the unlabeled data to the same latent space as the labeled data and outputs a second latent representation 214 ($z^u$). Both the first latent representation 212 and the second latent representation 214 are input into an adversarial discriminator 216, which performs a function denoted D( ). The adversarial discriminator 216 is configured and trained to classify whether data input into the adversarial discriminator 216 is from a labeled or unlabeled data pool. In some embodiments, the output of the adversarial discriminator 216 is a sigmoid function that indicates the likelihood that a certain sample is from the labeled pool. The adversarial discriminator 216 may be configured to provide a score or similarity metric (s) defining the informativeness of an unlabeled sample $x^U$ with respect to all labeled samples $X^L$ as follows:

$$s(x^H) = sim(x^U, X^L) \quad (3)$$

In Equation (3), $X^L$ is the set containing all labeled samples, and sim( ) defines a similarity score between an unlabeled sample point $x^U$ and a training set of labeled samples $X^L$. The score s serves to rank unlabeled samples based on their inherent informativeness similarity to existing labeled data. A low similarity score implies the unlabeled sample $x^U$ is not related to any labeled samples in the training set $X^L$, while a high similarity score implies the unlabeled sample $x^U$ is closely related to one or more labeled samples in the training set $X^L$. In some embodiments, the similarity score can be a value at or between zero and one, where zero is the lowest score indicating the unlabeled sample is not related to the samples in the training set and one is the highest score indicating the unlabeled sample is closely related to samples in the training set. Values between zero and one provide a metric for how closely related or unrelated an unlabeled sample is to the labeled samples. For example, if the adversarial discriminator 216 outputs a score for an unlabeled sample at 0.1, the unlabeled sample can be determined to be unrelated to the labeled samples. As another example, if the adversarial discriminator 216 outputs a score for an unlabeled sample at 0.9, the unlabeled sample can be determined to be closely related to the labeled samples.

In various embodiments, a labeling priority is offered to samples with low similarity scores by a score analysis and labeling module 218. In some embodiments, the model 200 used for training does not include the score analysis and labeling module 218, since the score analysis and labeling module 218 may be used at runtime after training of the model 200. For example, if the model 200 is configured for image captioning and if a high number of labeled input samples in the data store 202 concern images of sports (such as humans skating, running, swimming, etc.), unlabeled images of humans engaged in sporting activities will be given a high score. If, for instance, one of the unlabeled images includes a plate of food, the image of the plate of food will be given a low score. The image with the low score is then prioritized for labeling, such as manual labeling or image captioning by a user, because an image of a plate of food will offer greater new knowledge to the system than will additional images of humans engaged in sporting activities. The images with high scores can be sent to a separate labeling network used to label data, since the images with high scores are likely to be correctly labeled by this separate network because the images with high scores are similar to already-labeled data. Prioritizing the labeling of unlabeled data given low scores by the adversarial discriminator 216 thus provides for bringing valuable complementary information not covered by the existing training set of labeled data. Training of the model 200 includes supplying one or more data labeled samples $x^L$ and one or more unlabeled samples $x^U$ to the model and minimizing the loss of the first feature encoder 204, the second feature encoder 206, and the feature decoder 210 and minimizing the loss of the adversarial discriminator 216.

Although FIG. 2 illustrates one example of an active machine learning training model 200, various changes may be made to FIG. 2. For example, the labeled and unlabeled data here may be obtained from separate data stores 202. As another example, each of the feature encoders 204 and 206 may have access to its own set of parameters 208.

Figure 3:
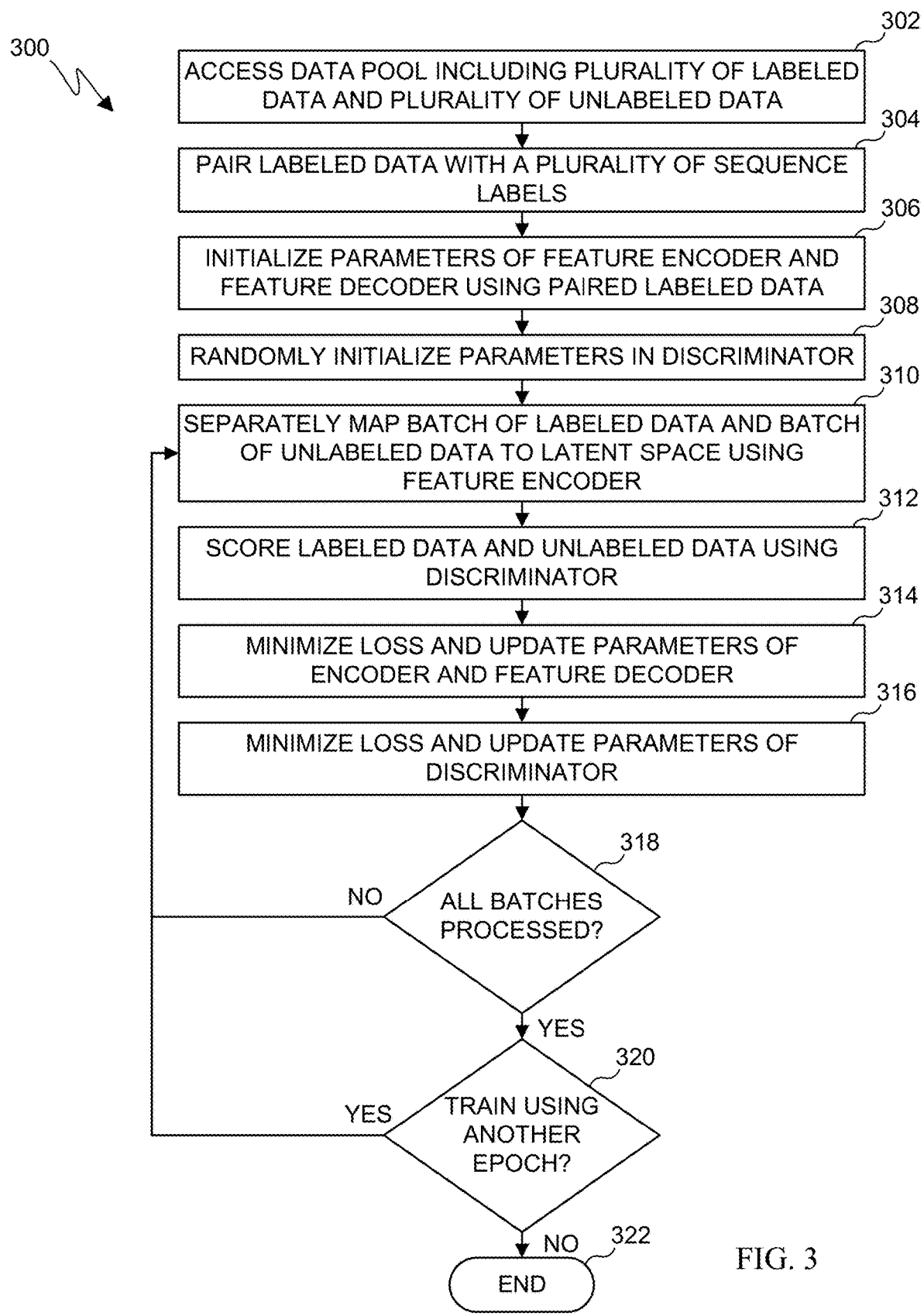
FIG. 3 illustrates an example active machine learning training process in accordance with various embodiments of this disclosure.

FIG. 3 illustrates an example active machine learning training process 300 in accordance with various embodiments of this disclosure. For ease of explanation, the process 300 may be described as being executed or otherwise used by the processor(s) 120 of any of the electronic devices 101, 102, 104 or the server 106 in FIG. 1. However, the process 300 may be used by any suitable device(s) and in any suitable system.

At block 302, the processor accesses a data pool (X) in at least one storage location, such as the data store 202, which includes a plurality of labeled data ($X^L$) and a plurality of unlabeled data ($X^U$). At block 304, the processor pairs the labeled data ($X^L$) with a plurality of sequence labels or tokens ($Y^L = \{y_1^L \ldots y_P^L\}$) as described above with respect to FIG. 2. At block 306, the processor initializes parameters of the feature encoders 204 and 206 and the feature decoder 210 using the paired labeled data. This includes training the encoder-decoder framework of the feature encoders 204, 206 and the feature decoder 210 with paired labeled data and tokens $\{X^L, Y^L\}$, such as is described with respect to Equations (1) and (2) above. At block 308, the processor initializes parameters in the adversarial discriminator 216 randomly.

At block 310, the processor separately maps a batch of labeled data and a batch of unlabeled data to a latent space using the feature encoder 204 and 206. In some embodiments, the feature encoders 204 and 206 have shared parameters 208 and thus are configured in the same manner such that the same feature encoder processes the labeled data and the unlabeled data in separate instances. It will be understood that the batch of labeled data and the batch of unlabeled data can be a subset of one or more samples from all labeled data and unlabeled data, respectively, stored in the data store 202 and used for training purposes. Mapping the batch of labeled data using the feature encoder 204 provides a first latent representation 212 such that $z^L = M(x^L)$. Mapping the batch of unlabeled data using the feature encoder 206 provides a second latent representation 214 such that $z^U = M(x^U)$. At block 312, the processor inputs the first latent representation 212 and the second latent representation 214 into the adversarial discriminator 216 to score the labeled and unlabeled data using the current configuration of the adversarial discriminator 216, providing similarity scores for the labeled data and unlabeled data to already-labeled data.

At block 314, the processor minimizes the loss and updates the parameters of the feature encoders 204, 206 and the feature decoder 210. At block 316, the processor minimizes the loss and updates parameters of the adversarial discriminator 216. The learning objectives of the feature encoders 204, 206 and the adversarial discriminator 216 are adversarial in nature. From the perspective of the feature encoders 204, 206, the feature encoders 204, 206 are configured to map all data to a latent space where both labeled and unlabeled data follow similar probabilistic distributions. In a scenario in which $z^L$ and $z^U$ follow the exact same generative probability, the feature decoder 210 trained with $z^L$ would be capable of working on the second latent representation 214 obtained from the unlabeled data. The feature encoders 204, 206 thus are configured to encourage the adversarial discriminator 216 to regard all latent representations ($z^L$ and $z^U$) as already labeled, which encourages the adversarial discriminator 216 to output a score of a value of one for both $z^L$ and $z^U$. Minimizing the loss at block 314 may be defined as follows:

$$\min L_M = E_{x^L \sim X^L}[\log D(M(x^L))] - E_{x^U \sim X^U}[\log D(M(x^U))] + \lambda L_S(X^L, Y^L) \quad (4)$$

The loss is modeled by the cross-entropy in the first two terms of Equation (4). In addition to the cross-entropy loss defined with respect to the adversarial discriminator 216, Equation (4) also takes the supervised loss of Equation (2) (the third term of Equation (4)) into consideration. Objectives of training the feature encoders 204, 206 are to (i) encourage the adversarial discriminator 216 to regard all latent representations as already labeled and (ii) improve the fitting of labeled data in the model 200.

The learning objectives of the adversarial discriminator 216 go against, or are adversarial to, the learning objectives of the feature encoders 204, 206 defined by Equation (4). The adversarial discriminator 216 is trained and configured to correctly assign or classify the first latent representation 212 of the labeled samples ($z^L = M(x^L)$) to the labeled category ($D(Z^L) = 1$) and the second latent representation 214 of the unlabeled samples ($z^u$=M($x^u$)) to the unlabeled category (D($Z^U$)=0). The learning objectives of the adversarial discriminator 216 may be defined as follows:

$$\min L_D = -E_{x^L \sim X^L}[\log D(M(x^L))] - _{x^U \sim X^U}[\log(1-D(M(x^U)))] \quad (5)$$

The adversarial discriminator 216 is configured to implicitly compare the distributions of the unlabeled samples and the labeled samples. In some embodiments, the adversarial discriminator 216 outputs low scores for unlabeled samples that are most dissimilar to labeled data, and the scores provided by the adversarial discriminator 216 serve as an informativeness similarity score that can be used for Equation (3). In some embodiments, the feature encoders 204, 206, the feature decoder 210, and the adversarial discriminator 216 can all be trained in an alternative manner by iteratively optimizing the objectives in Equations (4) and (5).

At decision block 318, the processor determines if all samples or mini-batches have been processed. If not, the process 300 returns to block 310 to repeat the operations in blocks 310-316. This allows the loss to be minimized and the parameters to be updated for all mini-batches in an epoch used for training. If the processor determines that all batches have been processed at decision block 318, the processor determines whether to continue training the model 200 using another epoch at decision block 320. If so, the processor returns to block 310 to repeat the operations in blocks 310-316 for the next epoch. If the processor determines that no further training of the model 200 is to be performed at decision block 320, the process ends at block 322, ideally resulting in a well-trained model (including trained feature encoders 204, 206, a trained feature decoder 210, and a trained adversarial discriminator 216).

Although FIG. 3 illustrates one example of an active machine learning training process 300, various changes may be made to FIG. 3. For example, while shown as a series of steps, various steps in FIG. 3 may overlap, occur in parallel, occur in a different order, or occur any number of times.

Figure 4:
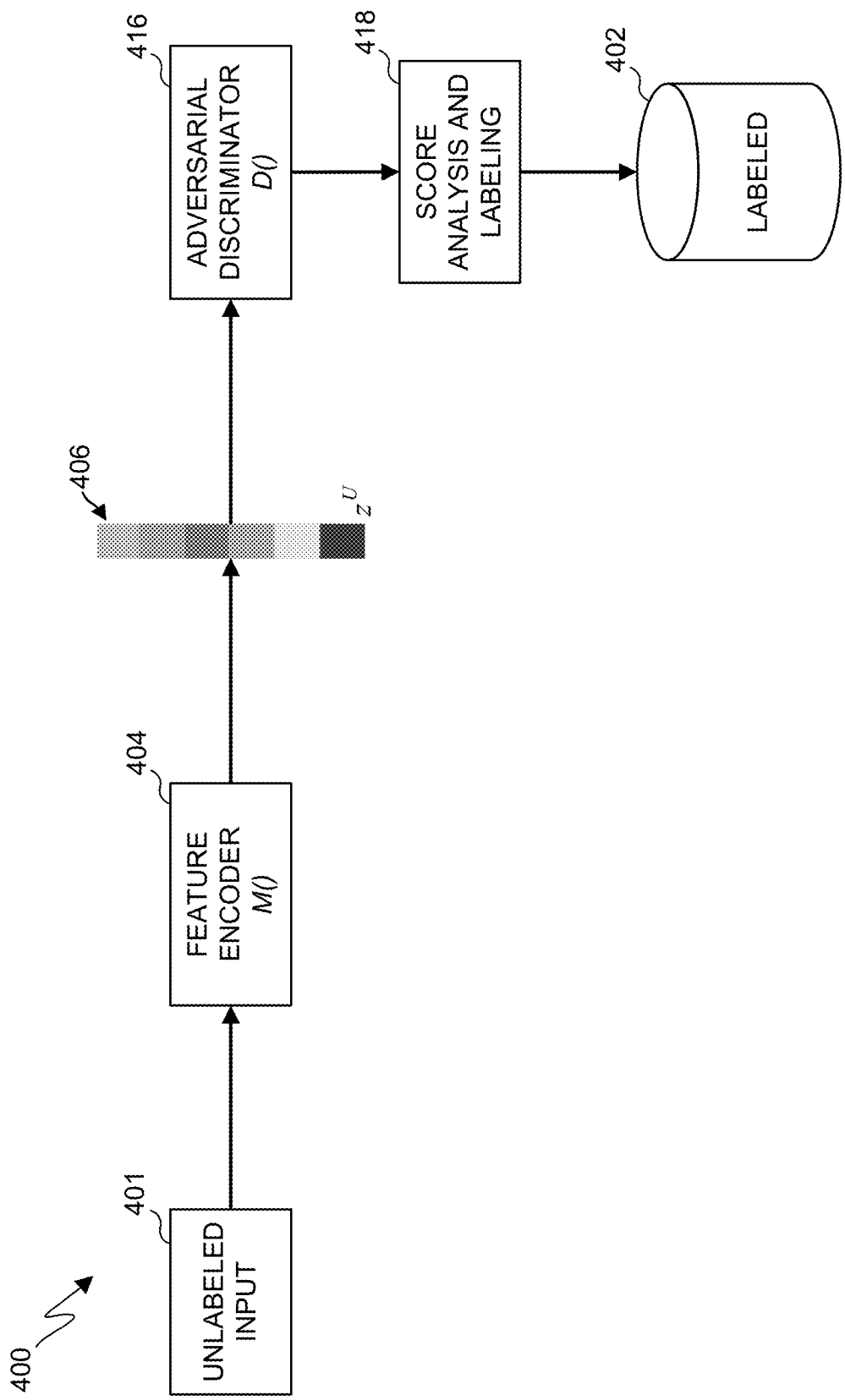
FIG. 4 illustrates an example active machine learning model in accordance with various embodiments of this disclosure.

FIG. 4 illustrates an example active machine learning model 400 in accordance with various embodiments of this disclosure. The model 400 is configured to offer labeling priorities and scoring for data that is least covered by existing labeled data. In some embodiments, the model 400 is not related to a structured output predictor and can conduct query sample scoring in a lightweight manner on large datasets. Also, in some embodiments, the model 400 represents a trained version of the model 200 and is used to screen at least one unlabeled input 401 received by an electronic device to determine if the unlabeled input is similar or dissimilar to labeled data already stored in a data store 402. Further, in some embodiments, the model 400 can be implemented on the server 106, and an electronic device (such as the electronic device 101) receives the unlabeled input 401 from a user and sends the unlabeled input 401 to the server 106 for screening. In other embodiments, the electronic device 101 can receive the unlabeled input 401 and execute the model 400. For ease of explanation, the model 400 may be described as being executed or otherwise used by the processor(s) 120 of any of the electronic devices 101, 102, 104 or the server 106 in FIG. 1. However, the model 400 may be used by any suitable device(s) and in any suitable system.

As shown in FIG. 4, the model 400 includes a trained feature encoder 404, which performs an encoding function denoted M( ). The processor inputs the unlabeled input 401 into the feature encoder 404, which encodes the unlabeled input 401 to provide a latent representation 406 ($z^U$) from the unlabeled input 401. The processor inputs the latent representation 406 into a trained adversarial discriminator 416. The processor determines from the adversarial discriminator 416 a similarity score or metric of the unlabeled input 401 to labeled data with which the adversarial discriminator 416 was trained as described above with respect to FIGS. 2 and 3. A score s generated by passing the unlabeled input 401 through the feature encoder 404 and the adversarial discriminator 416 may be defined as follows:

$$s(x^U) = D(M(x^U)) \in (0,1), \forall x^U \in X^U \quad (6)$$

A score of s=1 represents that the information content of the unlabeled input 401 is most covered by the labeled data. A score of s=0 represents that the information content of the unlabeled input 401 is least covered by the labeled data.

Once the processor obtains a score or metric using the adversarial discriminator 416, the processor executes a score analysis and labeling module 418. In some embodiments, the processor uses the score analysis and labeling module 418 to analyze the score or metric to determine a type of labeling process to apply to the unlabeled input 401. The analysis performed on the score can, in some embodiments, include a threshold comparison to determine if the score is above or below a threshold. For example, if a threshold value is set to 0.66 and the adversarial discriminator 416 outputs a score with a value of s=0.95, the processor may determine that the unlabeled input 401 is highly similar to labeled data already included in the data store 402. The processor then labels the unlabeled input 401 according to a sequence learning and labeling model that, in some embodiments, is routinely executed to perform labeling of data. The labeling model used can depend on the type of data and objectives of the model 400. For instance, if the data is utterance data for natural language understanding, the unlabeled input can be sent to a sequence labeling network such as an LSTM for labeling utterances. Since the unlabeled input is determined to be highly similar to labeled data already accessible to the system and usable for training of the sequence labeling network, there can be a high confidence that the sequence labeling network will accurately label the input 401.

If, however, the threshold value is set to 0.66 and the adversarial discriminator 416 outputs a score with a value of s=0.12, the processor may determine that the unlabeled input 401 is highly dissimilar to labeled data already included in the data store 402. The processor then initiates and performs an alternative labeling process, such as requesting a manual label input from a user. For example, a prompt can be displayed on an electronic device of the user, such as the electronic device 101, that asks the user to input a label or select a closest label to the input 401 from among a number of label options. Since the unlabeled input is determined to be highly dissimilar to labeled data accessible to the system, performing the alternative labeling process provides data on inputs that carry valuable new information to supplement the labeled data already stored in the data store 402. Once the input 401 is labeled by either the sequence labeling model or the alternative labeling process, data from the input 401 is stored as labeled data in the data store 402. In some embodiments, the model 400 can be further trained, as described above with respect to FIGS. 2 and 3, using the newly-labeled data.

It will be understood that, in some embodiments, the trained model 400 does not include a feature decoder, such as the feature decoder 210, for uncertainty measure calculations. This is because the feature encoder 404 and the adversarial discriminator 416 have already been trained along with the feature decoder 210 as described above with respect to FIGS. 2 and 3, so the adversarial discriminator 416 is trained to output a score or metric based on labeled data used during training. In some embodiments of the model 400, predictor-dependent uncertainty scores can be incorporated into the model 400 since the model 400 is trained with a probabilistic decoder CO and the calculations of uncertainty measures from the model 400 can be a natural part of the model 400. As a particular example, if K top samples are selected by the adversarial discriminator 416, sequence-based uncertainty scores $\psi(x^U)$ of the K samples (such as the sequence entropy) can be calculated. The top K samples with the highest uncertainty scores can be selected as query samples for labeling. These candidate query samples are determined by the adversarial discriminator 416, and the probabilistic decoder provides auxiliary information for fine-grained selection. In these embodiments, the complexity for sequence-based uncertainty measure computations can be reduced because the uncertainty measure is computed on K candidate samples rather than the whole pool of unlabeled samples.

Although FIG. 4 illustrates one example of an active machine learning model 400, various changes may be made to FIG. 4. For example, the unlabeled inputs 401 may be obtained from any number of data sources. As another example, the labeled data may be provided to one or multiple data stores 402.

Figure 5:
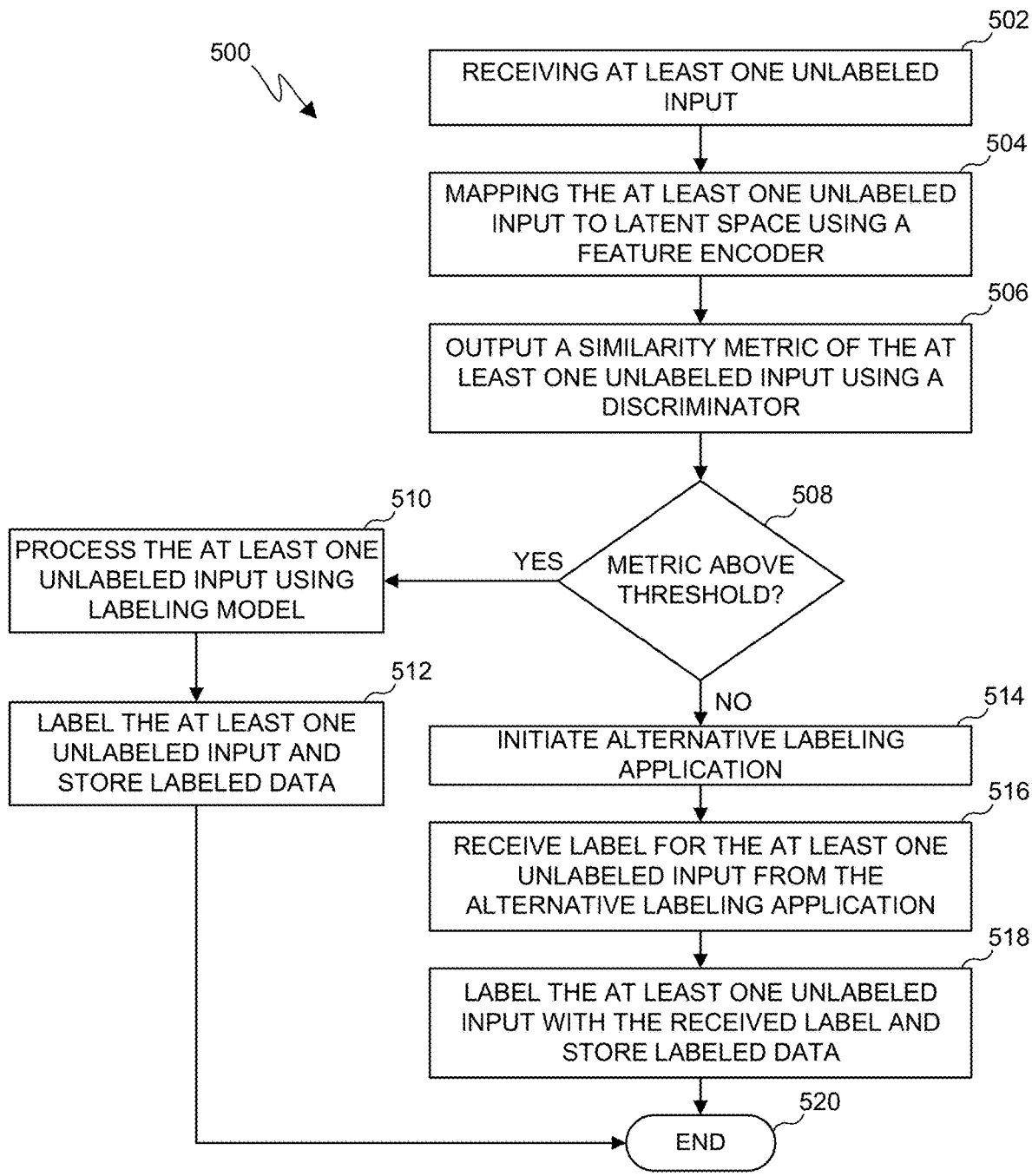
FIG. 5 illustrates an example active machine learning labeling process in accordance with various embodiments of this disclosure.

FIG. 5 illustrates an example active machine learning labeling process 500 in accordance with various embodiments of this disclosure. For ease of explanation, the process 500 may be described as being executed or otherwise used by the processor(s) 120 of any of the electronic devices 101, 102, 104 or the server 106 in FIG. 1. However, the process 500 may be used by any suitable device(s) and in any suitable system.

At block 502, the processor receives at least one unlabeled input. At block 504, the processor maps the unlabeled input to a latent space using a feature encoder, such as the feature encoder 404, to encode the unlabeled input and provide a latent representation ($z^u$) from the unlabeled input. At block 506, the processor executes an adversarial discriminator, such as the adversarial discriminator 416, to process the latent representation. The processor determines from the adversarial discriminator a similarity score or metric of the unlabeled input to labeled data with which the adversarial discriminator was trained as described above with respect to FIGS. 2 and 3. The score s provided by passing the unlabeled input through the feature encoder and the adversarial discriminator may be defined using Equation (6) above.

Once the processor obtains a score or metric using the adversarial discriminator, the processor determines if the score is above a threshold at decision block 508. If the processor determines that the score is above the threshold, the processor processes the unlabeled input using a separate labeling model at block 510. In some embodiments, the separate labeling model is routinely executed to perform labeling of data. For example, if a threshold value is set to 0.66 and the adversarial discriminator outputs a score with a value of s=0.95, the processor may determine that the unlabeled input 401 is highly similar to labeled data already accessible to the system. At block 512, the processor labels the unlabeled input according to the labeling model. The labeling model used can depend on the type of data and objectives of the process 500. For instance, if the data is utterance data for natural language understanding, the unlabeled input can be sent to a sequence labeling network for labeling utterances. Since the unlabeled input is determined to be highly similar to labeled data already accessible to the system and usable for training of the sequence labeling network, there can be a high confidence that the sequence labeling network will accurately label the input. The process 500 then ends at block 520.

If the processor determines that the metric is not above the threshold at decision block 508, the processor initiates an alternative labeling process at block 514, such as by requesting a manual label input from a user. For example, if the threshold value is set to 0.66 and the adversarial discriminator outputs a score with a value of s=0.12, the processor may determine that the unlabeled input is highly dissimilar to labeled data already accessible to the system, and the alternative labeling process is initiated. It will be understood that these threshold values and scores are merely examples and that the threshold can be set to any value determined to be indicative of data that is similar or dissimilar to stored labeled data.

At block 516, the processor receives a label for the unlabeled input from the alternative labeling application. For example, a prompt can be displayed on an electronic device of the user, such as the electronic device 101, that asks the user to input a label or select a closest label to the input from among a number of label options. The label provided by the user is then received by the processor at block 516. At block 518, the processor labels the unlabeled input with the received label and stores the newly-labeled data. Since the unlabeled input is determined to be highly dissimilar to labeled data accessible to the system, performing the alternative labeling process provides data on inputs that carry valuable new information to supplement the labeled data already stored. The process 500 then ends at block 520.

Although FIG. 5 illustrates one example of an active machine learning labeling process 500, various changes may be made to FIG. 5. For example, while shown as a series of steps, various steps in FIG. 5 may overlap, occur in parallel, occur in a different order, or occur any number of times.

Figure 6:
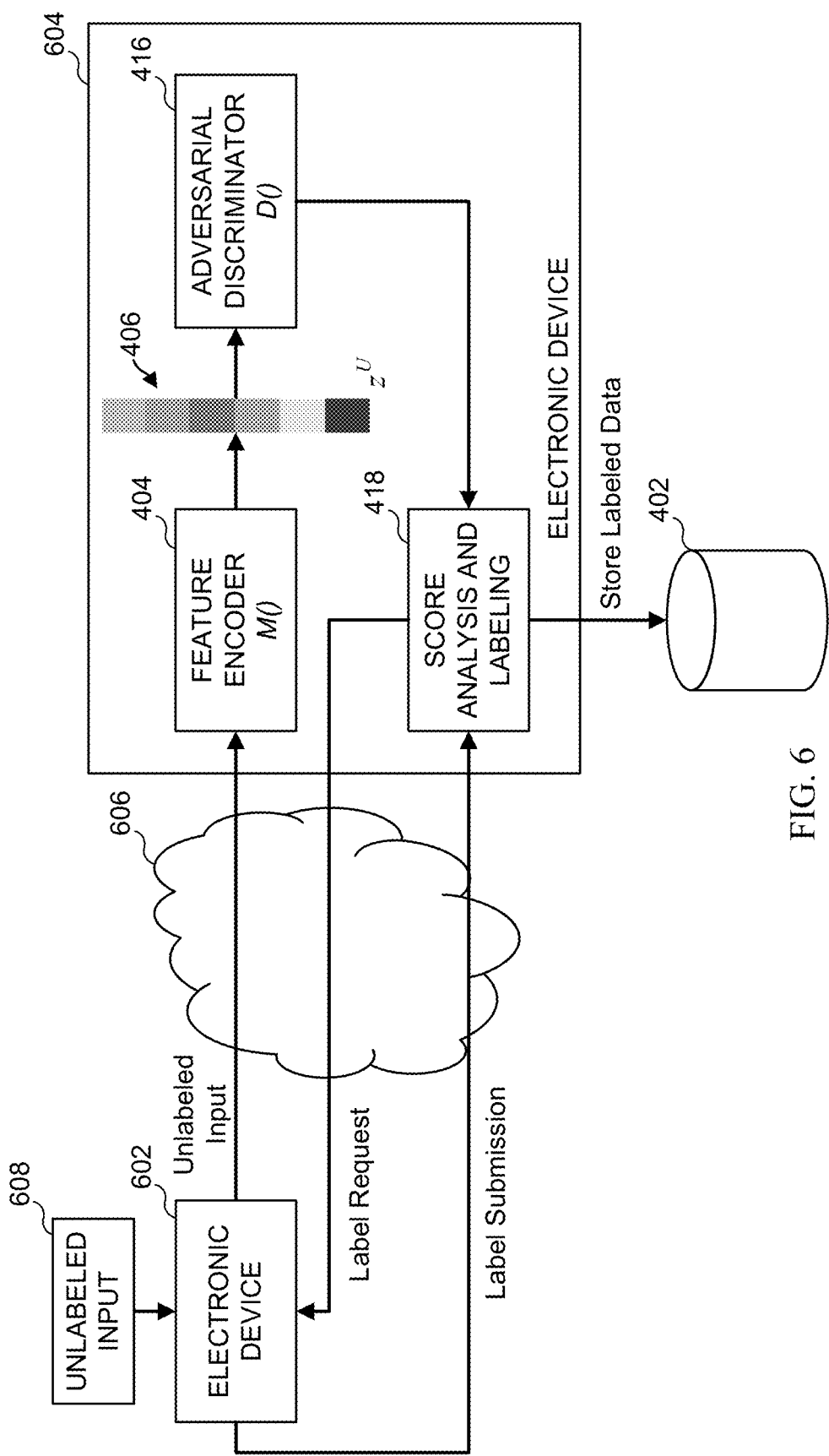
FIG. 6 illustrates an example active machine learning labeling system in accordance with various embodiments of this disclosure.

FIG. 6 illustrates an example active machine learning labeling system 600 in accordance with various embodiments of this disclosure. As shown in FIG. 6, the system 600 includes a first electronic device 602 and a second electronic device 604 communicatively connected over a network 606. In various embodiments, the first electronic device 602 and the second electronic device 604 can be any of the electronic devices 101, 102, 104 or the server 106 of FIG. 1. For example, the first electronic device 602 can be the electronic device 101, the second electronic device 604 can be the server 106, and the network 606 can be the network 162. In other embodiments, the system 600 can be implemented on a single electronic device, such as any one of the electronic devices 101, 102, 104 or the server 106.

The first electronic device 602 is configured to receive an unlabeled input 608. The unlabeled input 608 can represent inputs such as images captured by the first electronic device 602, utterances recorded by the first electronic device 602, or other types of data. The second electronic device 604 is configured to execute the model 400 (including the feature encoder 404, the adversarial discriminator 416, and the score analysis and labeling module 418) as described above with respect to FIG. 4. Upon receiving the unlabeled input 608, the first electronic device 602 transmits the unlabeled input over the network 606 to the second electronic device 604, which provides the unlabeled input 608 to the feature encoder 404. In some embodiments, the second electronic device 604 inputs the unlabeled input 608 into the model 400 as a screening process. In the screening process, before attempting to label the unlabeled input 608, the second electronic device 604 determines how similar the unlabeled input 608 is to labeled data already accessible to the second electronic device 604, such as in the data store 402. The data store 402 can be a local storage location on the second electronic device 604 or a remote storage location accessible by the second electronic device 604 as illustrated in FIG. 6. Once the second electronic device determines the similarity of the unlabeled input 608 to labeled data, the second electronic device 604 determines which labeling process to use to label the unlabeled input 608. For instance, the second electronic device 604 can use a sequence labeling framework for data with high scores or an alternative labeling process (such as a manual labeling process that requests labels from a user) for data with low scores.

In some embodiments, a labeling process executed by the second electronic device 604 or another electronic device first attempts to label the unlabeled input 608 before providing the unlabeled input 608 to the model 400. Upon a determination that the labeling process fails to label the unlabeled input 608, the second electronic device 604 stores the unlabeled input into a data set and inputs the data set into the model 400. The second electronic device 604 also selects one or more entries from the data set based on a similarity between the one or more entries and the labeled data. The second electronic device 604 further labels the one or more entries using an alternative labeling process. Once the data is labeled, the model 400 can be further trained using the newly labeled data.

FIG. 6 also illustrates an example alternative labeling process. Here, the second electronic device 604 inputs the unlabeled input 608 into the feature encoder 404, which maps the unlabeled input 608 into a latent space defined by the feature encoder 404 and outputs a latent representation 406. The second electronic device 604 inputs the latent representation 406 into the adversarial discriminator 416, which outputs a score or metric indicating the informativeness of the unlabeled data 608 and similarity of the unlabeled data 608 to labeled data already stored in the data store 402. The second electronic device 604 executes a score analysis and labeling module 418 that, based on the score, determines whether or not to use an alternative labeling process. For example, if the score output from the adversarial discriminator 416 is a low score or a score close to zero (such as 0.08 or 0.10), the electronic device can initiate an alternative labeling process. In the alternative labeling process, the score analysis and labeling module 418 or another component of the second electronic device 604 transmits a label request to the first electronic device 602. In some embodiments, the label request prompts the user to input a label to be used for the unlabeled input 608. Upon receiving one or more labels from the user, the first electronic device 602 transmits a label submission message to the score analysis and labeling module 418 of the second electronic device 604. The score analysis and labeling module 418 of the second electronic device 604 labels the unlabeled input 608 with the one or more labels transmitted from the first electronic device 602 and stores the newly labeled data in the data store 402.

As an example, assume the unlabeled input 608 is voice or utterance data used in voice recognition and natural language understanding services provided by the first electronic device 602 and/or the second electronic device 604 and the adversarial discriminator 416 provides a low score. The label request can cause a prompt to be displayed to the user on the first electronic device 602, where the prompt asks the user to provide a label or intent for the voice or utterance data. In some embodiments, the prompt can include a text input interface for the user to input a text label using an input method of the first electronic device 602, such as by using a touchscreen keyboard to enter the one or more labels. In other embodiments, the prompt can display to the user via the first electronic device 602 one or more label suggestions, such as by providing buttons on a touchscreen interface for selecting each of the one or more label suggestions, and the user can select the closest suggestion to the user's intent. In still other embodiments, other data types can be labeled in this way, such as when the unlabeled input is image data to be used in image captioning and the user is prompted to input caption text, select a suggested caption, or otherwise provide labels for the unlabeled input 608.

Although FIG. 6 illustrates one example of an active machine learning labeling system 600, various changes may be made to FIG. 6. For example, as noted above, the active machine learning labeling system 600 in FIG. 6 may be implemented using a single device or using a combination of devices.

Figure 7:
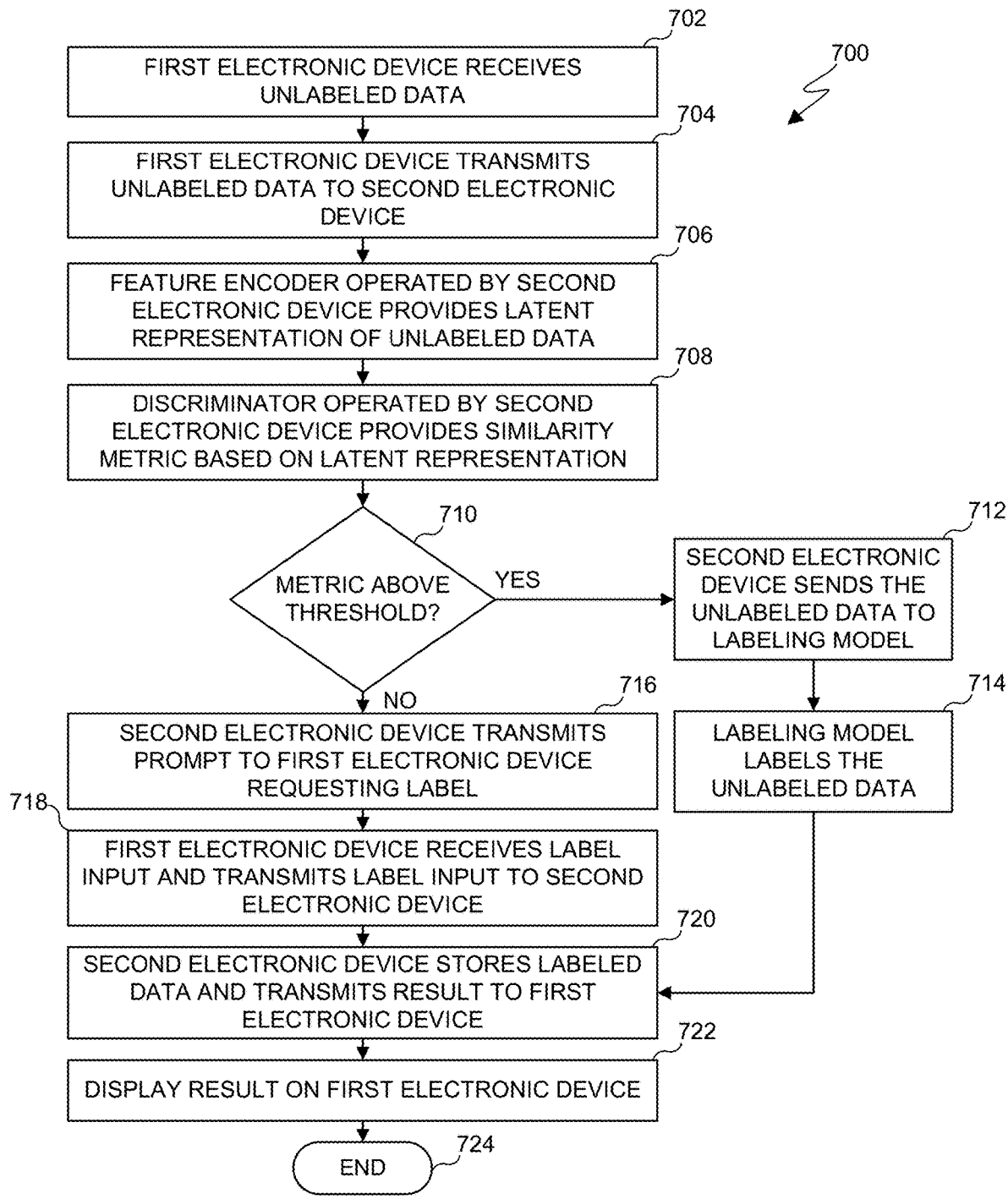
FIG. 7 illustrates an example screening and labeling process in accordance with various embodiments of this disclosure.

FIG. 7 illustrates an example screening and labeling process 700 in accordance with various embodiments of this disclosure. For ease of explanation, the process 700 may be described as being executed or otherwise used by the processor(s) 120 of any of the electronic devices 101, 102, 104 or the server 106 in FIG. 1. For example, the process 700 here includes the use of a first electronic device and a second electronic device, which may be any of the electronic devices 101, 102, 104 or the server 106. As a particular example, the first electronic device can be the electronic device 101, and the second electronic device can be the server 106. In other embodiments, the process 700 can be performed on a single electronic device, such as any one of the electronic devices 101, 102, 104 or the server 106. However, the process 700 may be used by any suitable device(s) and in any suitable system.

At block 702, the processor of the first electronic device receives unlabeled data. The unlabeled data can represent data such as images captured by the processor of the first electronic device, utterances recorded by the processor of the first electronic device, or other types of data. At block 704, the processor of the first electronic device transmits the unlabeled data to the second electronic device. The processor of the second electronic device performs a screening process at blocks 706-710. In the screening process, before attempting to label the unlabeled data, the processor of the second electronic device determines how similar the unlabeled data is to labeled data already accessible to the second electronic device. Thus, at block 706, the processor of the second electronic inputs the unlabeled data into a feature encoder executed by the processor, which provides a latent representation of the unlabeled data. At block 708, the processor of the second electronic device inputs the latent representation into an adversarial discriminator executed by the processor of the second electronic device to generate a similarity metric based on the latent representation. The similarity metric indicates the similarity of the unlabeled data to labeled data.

Once the processor of the second electronic device determines the similarity of the unlabeled data to labeled data, the processor of the second electronic device determines a labeling process to use to label the unlabeled data at decision block 710. For example, the processor of the second electronic device may use a sequence labeling framework for data with high scores at blocks 712 and 714 or an alternative labeling process at blocks 716, 718, 720, and 722 for data with low scores. If the processor of the second electronic device determines that the similarity metric is above a threshold at decision block 710, the process 700 moves to block 712. At block 712, the processor of the second electronic device sends the unlabeled data to a labeling model that is executed by the processor of the second electronic device or another electronic device and that is configured to label data that is similar to already-labeled data. At block 714, the processor of the second electronic device labels the unlabeled data according to an output of the labeling.

If the processor of the second electronic device determines that the metric is below the threshold at decision block 710, this indicates that the unlabeled data is dissimilar to labeled data. The process 700 then moves to block 716. At block 716, the processor of the second electronic device transmits a prompt to the first electronic device requesting a label. At block 718, the processor of the first electronic device receives a label input, such as an input from a user, and transmits the label input to the second electronic device. For example, if the unlabeled input is voice or utterance data used in voice recognition and natural language understanding services provided by the first electronic device and/or the second electronic device, the label request can cause a prompt to be displayed to the user on the first electronic device, where the prompt asks the user to provide a label or intent for the voice or utterance data. In some embodiments, the prompt can include a text input interface for the user to input a text label using an input method of the first electronic device, such as using a touchscreen keyboard to enter the one or more labels. In other embodiments, the prompt can display one or more label suggestions to the user via the first electronic device, such as by providing buttons on a touchscreen interface for selecting each of the one or more label suggestions. The user can then select the closest suggestion to the user's intent. In other embodiments, other data types can also be labeled in this way. At block 720, the processor of the second electronic device associates the label transmitted from the first electronic device with at least a portion of the unlabeled data, stores the newly-labeled data, and transmits a result to the first electronic device. At block 722, the processor of the first electronic device causes the first electronic device to present the result. For instance, the result can provide a notification of successful application of the label to the unlabeled data to the user of the first electronic device, or the result can provide an action based on the newly-labeled data to the user of the first electronic device. As particular examples, the first electronic device can display a suggestion based on natural language understanding for directions to a location the user uttered, where the location was originally dissimilar to labeled data but is now labeled. The process 700 then ends at block 724.

Although FIG. 7 illustrates one example of a screening and labeling process 700, various changes may be made to FIG. 7. For example, while shown as a series of steps, various steps in FIG. 7 may overlap, occur in parallel, occur in a different order, or occur any number of times.

Figure 8:
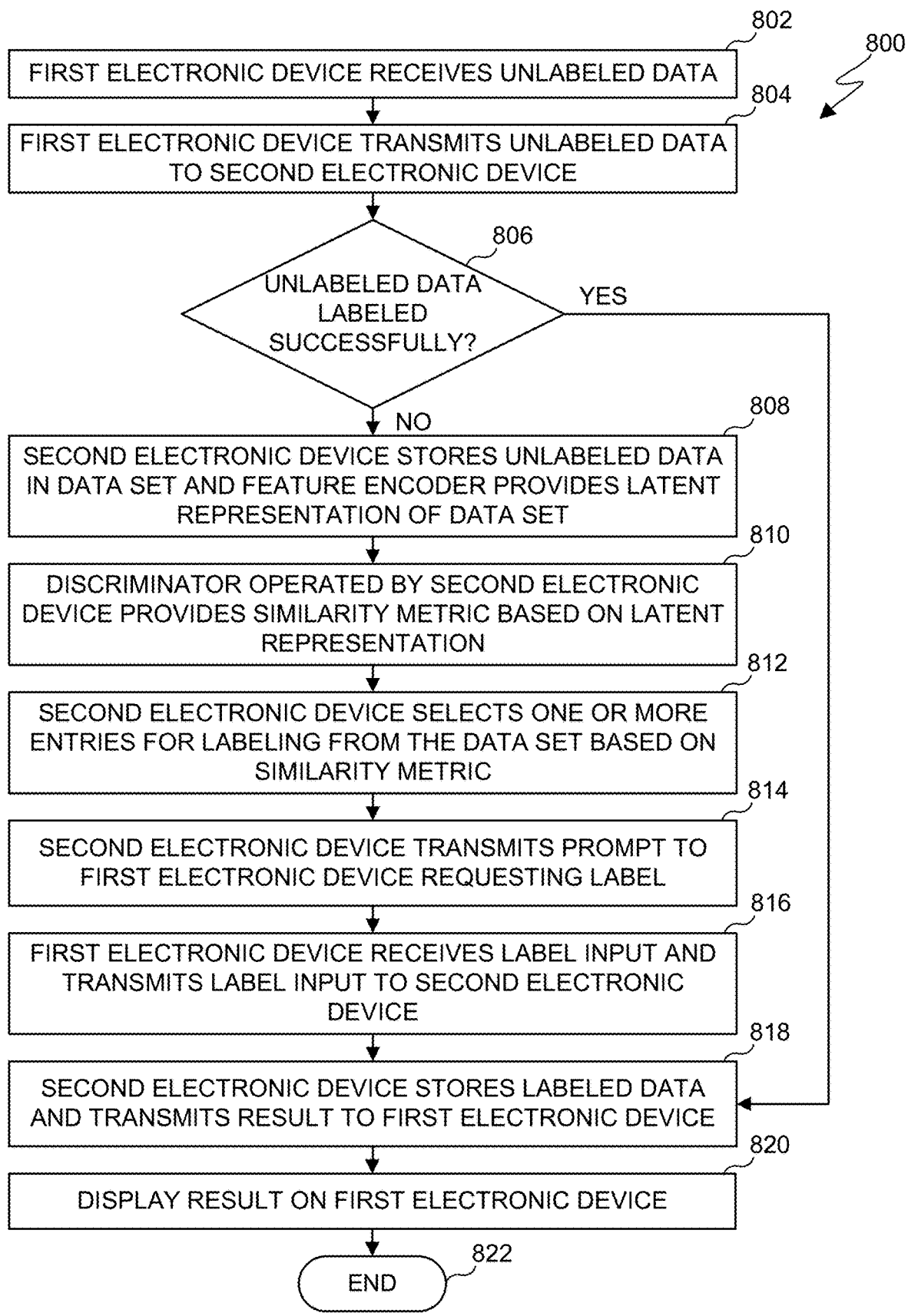
FIG. 8 illustrates an example labeling process in accordance with various embodiments of this disclosure.

FIG. 8 illustrates an example labeling process 800 in accordance with various embodiments of this disclosure. For ease of explanation, the process 800 may be described as being executed or otherwise used by the processor(s) 120 of any of the electronic devices 101, 102, 104 or the server 106 in FIG. 1. For example, the process 800 here includes the use of a first electronic device and a second electronic device, which may be any of the electronic devices 101, 102, 104 or the server 106. As a particular example, the first electronic device can be the electronic device 101, and the second electronic device can be the server 106. In other embodiments, the process 800 can be performed on a single electronic device, such as any one of the electronic devices 101, 102, 104 or the server 106. However, the process 800 may be used by any suitable device(s) and in any suitable system.

At block 802, the processor of the first electronic device receives unlabeled data. The unlabeled data can represent data such as images captured by the processor of the first electronic device, utterances recorded by the processor of the first electronic device, or other types of data. At block 804, the processor of the first electronic device transmits the unlabeled data to the second electronic device. In the process 800, a labeling process executed by the processor of the second electronic device or another electronic device first attempts to label the unlabeled data before providing the unlabeled data to the model 400. Upon a determination that the labeling process successfully labels the unlabeled data at decision block 806, the process 800 moves to block 818. At block 818, the processor of the second electronic device stores the newly-labeled data and transmits a result to the first electronic device. At block 820, the processor of the first electronic device causes the first electronic device to present the result. For instance, the result can provide a notification of successful application of the label to the unlabeled data to the user of the first electronic device, or the result can provide an action based on the newly-labeled data to the user of the first electronic device. As particular examples, the first electronic device can display a suggestion based on natural language understanding for directions to a location the user uttered, where the location was originally dissimilar to labeled data but is now labeled. The process 800 then ends at block 822.

If the processor of the second electronic device determines that the labeling process fails to label the unlabeled data at decision block 806, the processor of the second electronic device stores the unlabeled data into a data set and the processor of the second electronic device, using a feature encoder, provides one or more latent representations of the data set at block 808. At block 810, the processor of the second electronic device inputs the one or more latent representations into an adversarial discriminator executed by the processor of the second electronic device to generate a similarity metric based on the one or more latent representations, which indicates the similarity of unlabeled entries in the data set to labeled data. At block 812, the processor of the second electronic device selects one or more entries for labeling from the data set based on a similarity between the one or more entries and the labeled data. For example, if the adversarial discriminator 416 scored one of the one or more entries with a low score relative to a threshold score, the processor of the second electronic device selects this entry for labeling. The one or more selected entries of the data set are labeled using a labeling process, such as a manual labeling process, at blocks 814-820.

At block 814, the processor of the second electronic device transmits at least one prompt to the first electronic device requesting one or more labels for the one or more selected entries in the data set. At block 816, the processor of the first electronic device receives at least one label input, such as an input from a user, and transmits the at least one label input to the second electronic device. For example, if the unlabeled input is voice or utterance data used in voice recognition and natural language understanding services provided by the first electronic device and/or the second electronic device, the label request can cause a prompt to be displayed to the user on the first electronic device, where the prompt asks the user to provide a label or intent for the voice or utterance data. In some embodiments, the prompt can include a text input interface for the user to input a text label using an input method of the first electronic device, such as using a touchscreen keyboard to enter the one or more labels. In other embodiments, the prompt can display one or more label suggestions to the user via the first electronic device, such as by providing buttons on a touchscreen interface for selecting each of the one or more label suggestions. The user can then select the closest suggestion to the user's intent. In other embodiments, other data types can also be labeled in this way. At block 818, the processor of the second electronic device associates the at least one label transmitted from the first electronic device with at least a portion of the one or more selected unlabeled entries, stores the newly-labeled data, and transmits a result to the first electronic device. At block 820, the processor of the first electronic device causes the first electronic device to present the result. The process 800 ends at block 822.

Although FIG. 8 illustrates one example of a labeling process 800, various changes may be made to FIG. 8. For example, while shown as a series of steps, various steps in FIG. 8 may overlap, occur in parallel, occur in a different order, or occur any number of times.

Figure 9A:
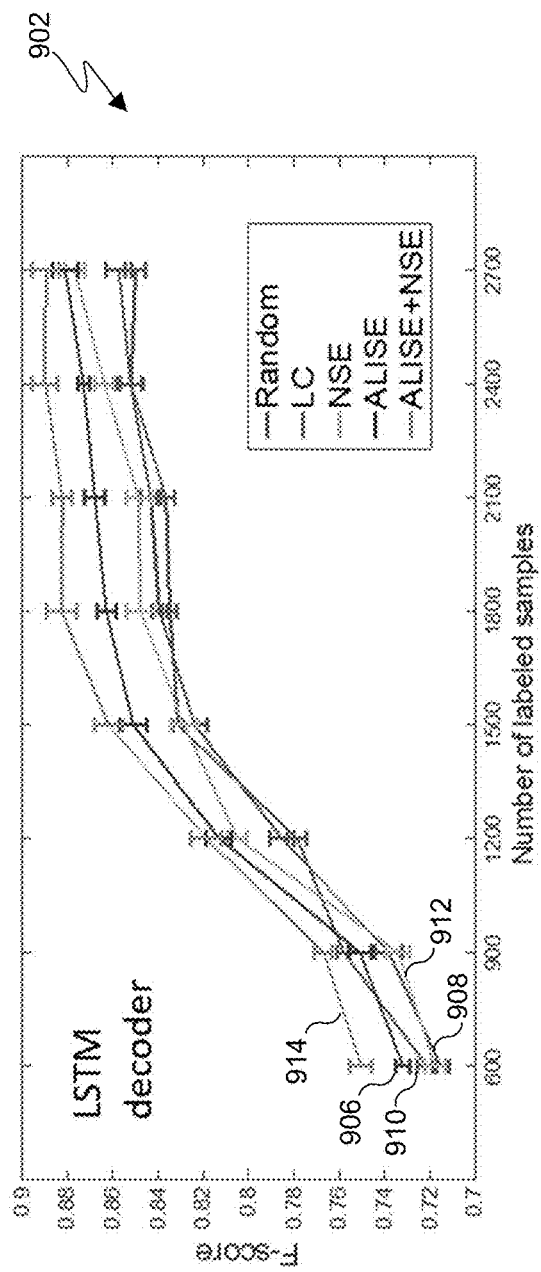
FIGS. 9A and 9B illustrate example slot filling results graphs in accordance with various embodiments of this disclosure.
Figure 9B:
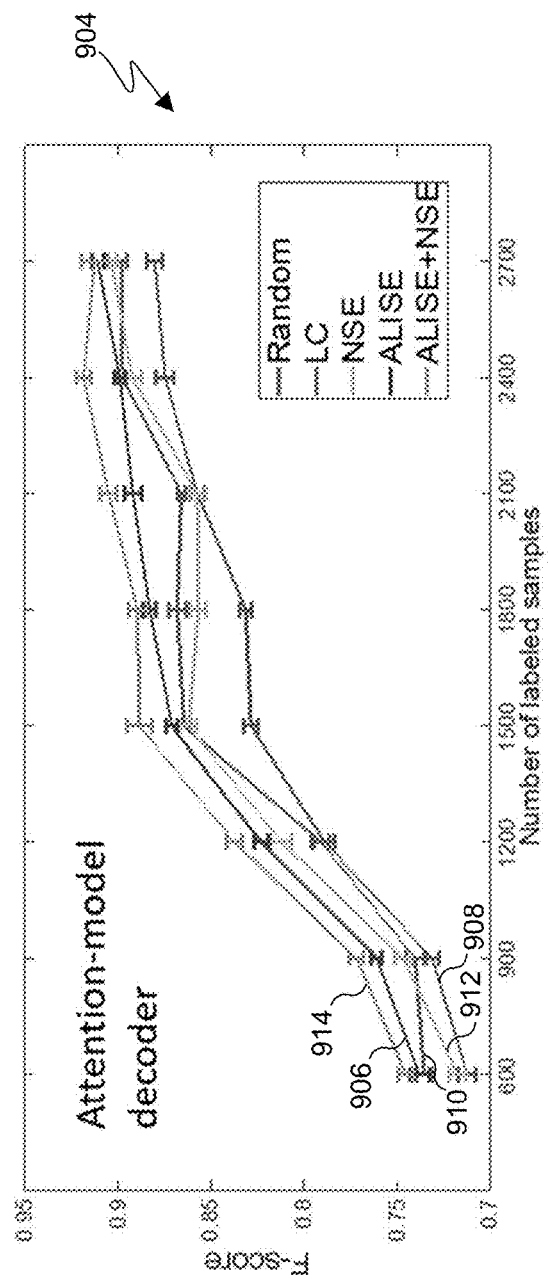

FIGS. 9A and 9B illustrate example slot filling results graphs in accordance with various embodiments of this disclosure. In particular, FIG. 9A illustrates a graph 902 showing results obtained using an LSTM decoder, and FIG. 9B illustrates a graph 904 showing results obtained using an attention-model decoder. The graphs 902 and 904 also show results obtained using various slot filling approaches, such as an Adversarial Active Learning for Sequences (ALISE) model corresponding to the systems and methods provided in this disclosure. Each of the graphs 902 and 904 includes an ALISE line 906 showing results using ALISE, a random sampling line 908, a least confidence (LC) line 910, an N-best sequence entropy (NSE) line 912, and an ALISE+NSE line 914.

Slot filling is a component of spoken language understanding that can be viewed as a sequence labeling problem, where both the input and output label sequences are of the same length. The results shown in the graphs 902 and 904 are obtained using an Airline Travel Information Systems (ATIS) dataset. For example, an input sentence of ATIS $x^L$={business, class, fare from SF, to LA} can be parsed as a label sequence $y^L$={B-class-type, I-class-type, O, O, B-from-loc, B-to-loc}. In this particular example, the dataset contains 5,138 utterances with annotated slot labels.

In this example, a bi-directional LSTM is used as the feature encoder network M( ). The bi-direction LSTM reads the input sequence in both forward and backward directions, and their hidden states at each step are concatenated as a long vector. 128 nodes for a word embedding layer and 64 hidden states are used for the feature encoder, providing 128 dimensions for the latent representation z. For graph 902, an LSTM decoder is used for the feature decoder C( ). For graph 904, an attention-model decoder is used as the feature decoder C( ). The adversarial network D( ) is configured by three dense-connected layers with 128 input layer units, 64 intermediate layer units, and one output layer unit, respectively. The output layer is further connected with a sigmoid function for probabilistic conversion. Rectified linear unit (ReLU) activation can be used among all other layers. Each token of the output sequence is coded as a one-hot vector, with the hot entry indicating the underlying category of the token. This deep learning system is trained by adaptive moment estimation (ADAM). Among labeled training samples, 10% are randomly selected as validation samples. In this example, the training process is terminated when the loss on the validation set does not decrease or when the optimization reaches 100 epochs.

As shown in the graphs 902 and 904, results of using an ALISE approach (such as the systems and methods described in this disclosure) and an ALISE+NSE approach are compared against random sampling, LC, and NSE approaches. The ALISE+NSE approach is a combination scoring approach that combines both ALISE scores and NSE scores for query sample selection. The number of optimal decoding parses (N) is chosen as five for both the NSE approach and the ALISE+NSE approach. 2,130 sequences are randomly chosen for active sequence learning testing samples. The remaining 3,000 sequences are used for model training and active labeling. Among the 3,000 sequences, p=300 samples are randomly chosen as initial labeled data. The ALISE model is trained with these p=300 samples, and active learning based on the remaining 3,000 non-testing samples is conducted. The top samples k=300 returned by different active learning methods are selected for the label query. After labeling, these k samples are merged with the existing p labeled samples as the new labeled pool. The ALISE and other active learning models are trained with the new labeled set, and the trained model is used to select another k unlabeled samples for the next round. Such query samples selection, labeling approach, and model retraining processes are iteratively conducted.

The active learning results with different training sample sizes are illustrated in the graph 902 for the LSTM decoder for sequence label prediction and in the graph 904 for the attention model decoder for sequence label prediction. A random splitting process is used five times and an average F-score with standard deviations are reported, as shown in the graphs 902 and 904. The graphs 902 and 904 illustrate that the ALISE model and the combinational extension (ALISE+NSE) both outperform the other learning approaches. When the labeled number size is small, the performance of the ALISE and ALISE+NSE models are even more significant.

The active learning systems and methods described in this disclosure provide for reduced computational costs compared to other learning approaches. For example, testing of computational costs for slot filling have indicated that the LC approach took 173 seconds to perform slot filling, the NSE approach took 245 seconds to perform slot filling, the ALISE took 1.7 seconds to perform slot filling, and the ALISE+NSE approach took 11.3 seconds to perform slot filling. The computational costs of using the active learning systems and methods of this disclosure are thus reduced, enabling the possibility of on-device learning and real-time learning and model updating.

Although FIGS. 9A and 9B illustrate examples of slot filling results graphs, various changes may be made to FIGS. 9A and 9B. For instance, it will be understood that the above examples and the results in the graphs 902 and 904 are merely examples to illustrate the efficiency of the active learning systems and methods described in this disclosure. This disclosure is not limited to any of the above examples or results.

Figure 10A:
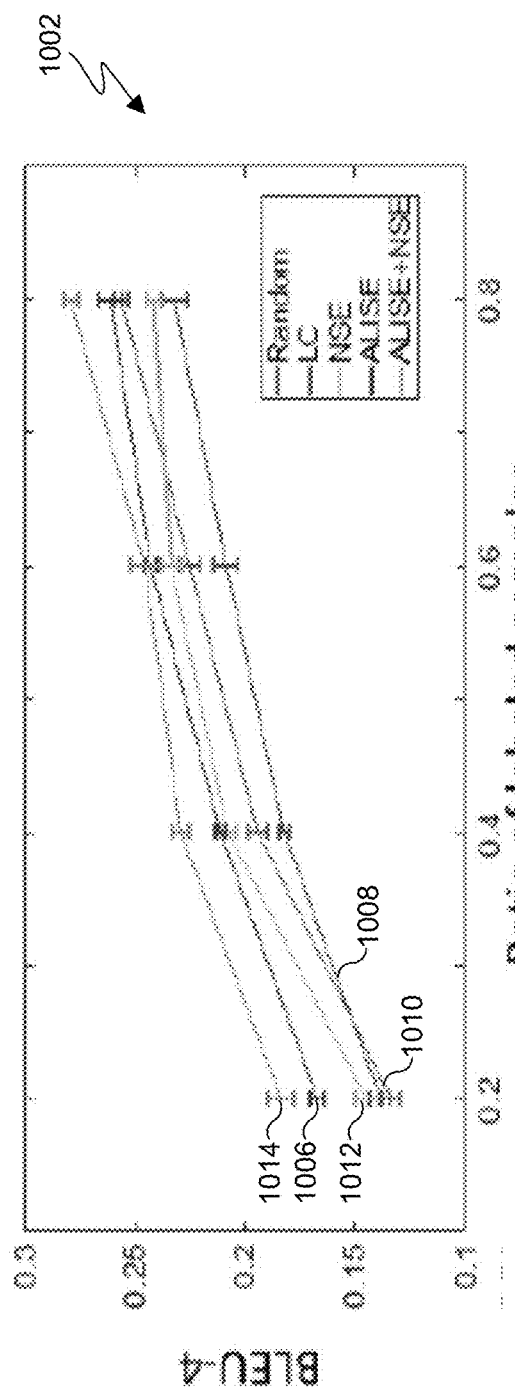
FIGS. 10A and 10B illustrate example image captioning results graphs in accordance with various embodiments of this disclosure.
Figure 10B:
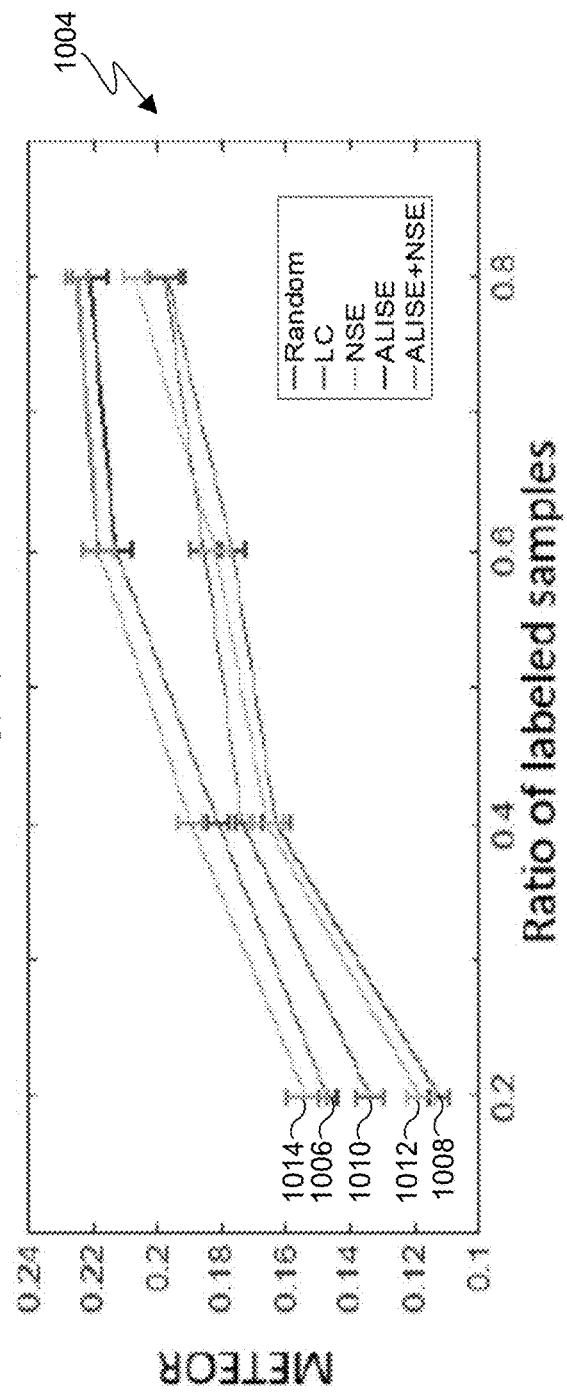

FIGS. 10A and 10B illustrate example image captioning results graphs in accordance with various embodiments of this disclosure. In particular, FIG. 10A illustrates a graph 1002 that shows results obtained using a BLEU-4 accuracy indicator, and FIG. 10B illustrates a graph 1004 that shows results obtained using a METEOR accuracy indicator. The graphs 1002 and 1004 show results obtained using various slot filling approaches including the ALISE model corresponding to the systems and methods provided in this disclosure. Each of the graphs 1002 and 1004 includes an ALISE line 1006 showing results using ALISE, a random sampling line 1008, an LC line 1010, an NSE line 1012, and an ALISE+NSE line 1014.

In this example, the ALISE approach and the other approaches are applied to the task of image captioning. The input data is an image, and a corresponding label is a caption sentence describing the content of the input image. An encoder-decoder learning framework is used along with an adversarial discriminator. In this particular example, a MICROSOFT COMMON OBJECTS IN CONTEXT (MSCOCO) dataset is used. This dataset includes 82,783 images for training, 40,504 images for validation, and 40,775 images for testing. Each image in the MSCOCO dataset is paired with five ground truth captions. Query sample selection is mainly conducted at the image level. If one image is selected for labeling, five ground truth captions corresponding to the selected image are accessible. Sentences are pre-processed, where words are converted to lower-case and non-alphanumeric characters are discarded. Words that appear less than twice in all captions are also discarded.

In this example, the 82,783 images of the training set are used as the data pool for active learning and query selection. A rate of the labeled samples is increased from 0.2 to 0.8 with 0.2 as an incremental step. Among the first image samples, half are randomly chosen as the initial labeled set, and the remaining images are selected by different active learning algorithms. The active selection and learning processes are iteratively conducted by adding k=0.2×82,783 new labeled samples to the labeled pool in each round. These extra k samples are selected by different active learning algorithms. The performance of the ALISE approach is shown in the graphs 1002 and 1004 and compared to the other approaches. The active learning process is repeated five times with average and standard deviation as shown in the graphs 1002 and 1004. As illustrated in the graphs 1002 and 1004, the ALISE and ALISE+NSE approaches outperform the other learning models.

The active learning systems and methods described in this disclosure provide for reduced computational costs compared to other learning approaches. For example, testing of computational costs for image captioning determined that the LC approach took 2,182 seconds to perform image captioning, the NSE approach took 3,956 seconds to perform image captioning, the ALISE approach took 6.9 seconds to perform image captioning, and the ALISE+NSE approach took 67.4 seconds to perform image captioning. The computational costs of using the active learning systems and methods of this disclosure are thus reduced, enabling the possibility of on-device learning and real-time learning and model updating.

Although FIGS. 10A and 10B illustrate examples of image captioning results graphs, various changes may be made to FIGS. 10A and 10B. For instance, it will be understood that the above examples and the results in the graphs 1002 and 1004 are merely examples to illustrate the efficiency of the active learning systems and methods described in this disclosure. This disclosure is not limited to any of the above examples or results.

Figure 11A:
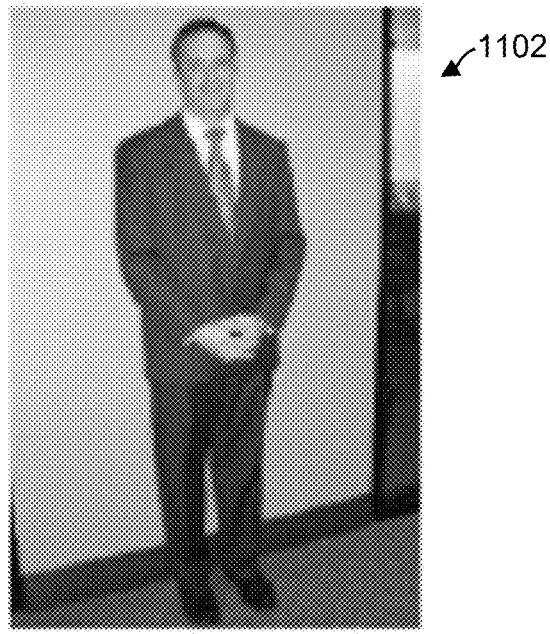
FIGS. 11A, 11B, 11C, 11D, and 11E illustrate example image captioning results in accordance with various embodiments of this disclosure.
Figure 11B:
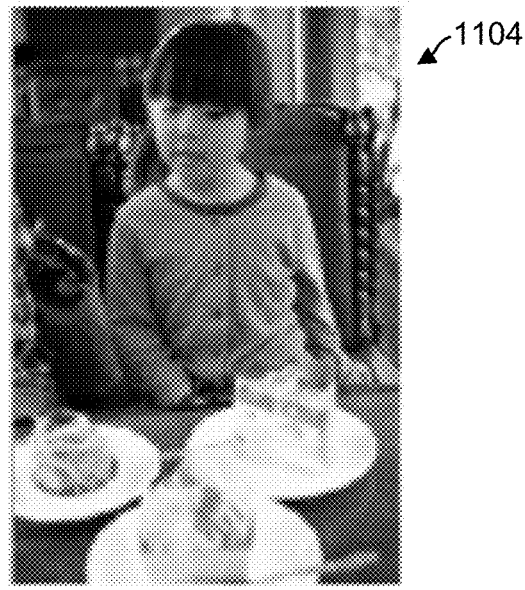
Figure 11C:
Figure 11D:
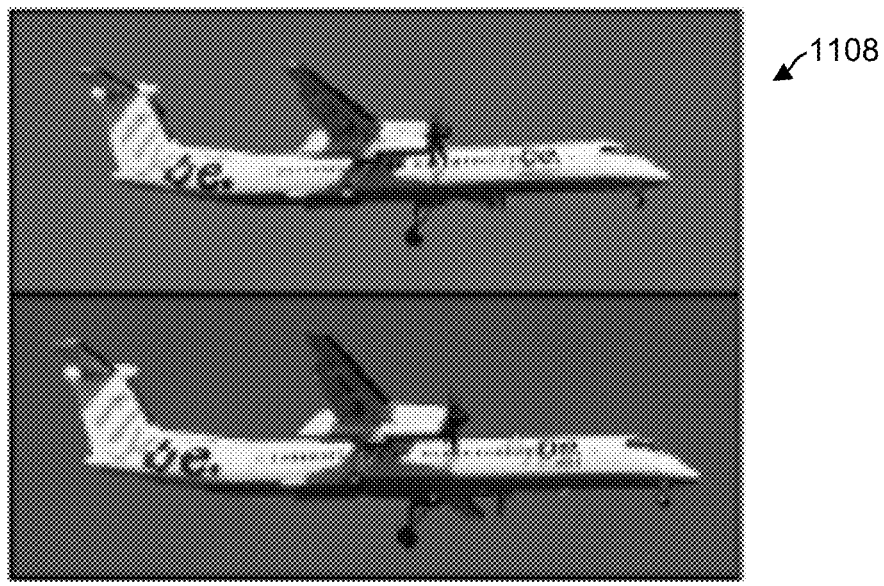
Figure 11E:

FIGS. 11A, 11B, 11C, 11D, and 11E illustrate example image captioning results in accordance with various embodiments of this disclosure. In particular, FIG. 11A illustrates an image 1102 of a man posing in a suit, FIG. 11B illustrates an image 1104 of a girl at a table with cake, and FIG. 11C illustrates an image 1106 of a bag on the floor (with the contents of the bag removed). Also, FIG. 11D illustrates an image 1108 of a plane flying through the sky, and FIG. 11E illustrates an image 1110 of people skiing down a ski slope through an inflatable arch.

FIGS. 11A, 11B, 11C, 11D, and 11E here also illustrate example image captioning results for each of the images 1102-1110, where the image captioning results are obtained using the NSE, ALISE, and ALISE+NSE approaches. The image captioning models are trained with 80% data points from a training set, and the same amount of training samples are selected by the different active learning methods. The results of the image captioning illustrate that the ALISE and ALISE+NSE models provide more complex sentence structures for image descriptions and provide more details regarding the visual information in the images because the ALISE approach can actively build training sets covering diverse information.

The image captioning results for the images 1102-1110 show unique and plausible descriptions as underlined words, and incorrect descriptions or words are shown as bold and italicized words. As shown in FIG. 11A, NSE described the image 1102 of a man posing in a suit as "a man in a suit and tie." ALISE described the image 1102 as "a man in a suit and tie standing next to a wall." ALISE+NSE described the image 1102 as "a man in business casual garb looks." The ALISE and ALISE+NSE approaches thus provided additional information and/or more complex sentence structures. FIGS. 11C and 11D illustrate similar results. While NSE described the images 1106 and 1108 as "a couple of bags are on the floor" and "a large plane flying through the air," respectively, ALISE and ALISE+NSE described the bags in the image 1106 as "luggage," and ALISE+NSE described the image 1108 as "a large passenger jet flying through a blue sky."

In FIG. 11B, NSE incorrectly described the image 1104 of a little girl as a "woman" and only described the cake as a plate of food, while the ALISE model correctly described the image 1104 as including a little girl and the ALISE+NSE model correctly described both the little girl and the food on the table being cake. FIG. 11B thus illustrates that the ALISE and ALISE+NSE models can improve image content understanding. In FIG. 11E, NSE described the image 1110 as "a man standing in the snow on skis," while the ALISE model described the image 1110 as "a man standing on the side of a ski slope" and the ALISE+NSE model described the image 1110 as "a man standing in the snow on skis next to a stop sign." FIG. 11E thus illustrates that the ALISE model and the ALISE+NSE model can be used to different effects depending on the image content.

Although FIGS. 11A, 11B, 11C, 11D, and 11E illustrate examples of image captioning results, various changes may be made to FIGS. 11A, 11B, 11C, 11D, and 11E. For example, it will be understood that the above examples using the images 1102-1110 are merely examples to illustrate the operational advantages of the active learning systems and methods described in this disclosure. This disclosure is not limited to any of the above examples or results.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A method for active learning, the method comprising:
mapping, by a feature encoder, entries in a data set including unlabeled data to a latent space;
selecting one or more entries from the data set including at least some of the unlabeled data based on a similarity between the one or more entries and labeled data, wherein selecting the one or more entries comprises determining that one or more similarity metrics associated with the one or more entries from the data set are at or above a threshold; and
labeling the one or more entries according to the similarity between the one or more entries and the labeled data.

2. The method of claim 1, further comprising:
receiving an unlabeled input; and
storing the unlabeled input into the data set based on a determination that a model fails to label the unlabeled input.

3. The method of claim 1, further comprising:
updating the labeled data with the one or more labeled entries; and
causing a model to be further trained based on the updated labeled data.

4. The method of claim 1, further comprising:
processing, by a discriminator, the mapped entries in the data set, wherein the discriminator is configured to distinguish unlabeled data from labeled data; and
outputting, by the discriminator, one or more similarity metrics associated with the entries in the data set including the one or more similarity metrics associated with the one or more entries from the data set that are at or above the threshold, wherein the one or more similarity metrics indicate a similarity of the entries in the data set to the labeled data.

5. The method of claim 4, wherein selecting the one or more entries from the data set based on the similarity between the one or more entries and the labeled data comprises:
determining that at least one similarity metric of the one or more similarity metrics associated with the one or more entries from the data set is below the threshold; and
labeling at least one entry of the one or more entries according to a manual labeling application.

6. The method of claim 5, wherein labeling the at least one entry of the one or more entries according to the manual labeling application comprises:
requesting at least one label, wherein the requested at least one label includes one or more options for providing the at least one label;
receiving at least one label input in response to the request for the at least one label; and
labeling the at least one entry of the one or more entries based on the at least one label input.

7. The method of claim 1, further comprising:
determining an uncertainty score for at least one data sample from the unlabeled data; and
selecting the at least one data sample as a query sample for labeling based on the uncertainty score.

8. An electronic device for active learning, the electronic device comprising:
at least one memory; and
at least one processor coupled to the at least one memory, wherein the at least one processor is configured to:
map, using a feature encoder, entries in a data set including unlabeled data to a latent space;
select one or more entries from the data set including at least some of the unlabeled data based on a similarity between the one or more entries and labeled data, wherein, to select the one or more entries, the at least one processor is configured to determine that one or more similarity metrics associated with the one or more entries from the data set are at or above a threshold; and
label the one or more entries according to the similarity between the one or more entries and the labeled data.

9. The electronic device of claim 8, wherein the at least one processor is further configured to:
receive an unlabeled input; and
store the unlabeled input into the data set based on a determination that a model fails to label the unlabeled input.

10. The electronic device of claim 8, wherein the at least one processor is further configured to:
update the labeled data with the one or more labeled entries; and
cause a model to be further trained based on the updated labeled data.

11. The electronic device of claim 8, wherein the at least one processor is further configured to:
process, using a discriminator, the mapped entries in the data set, wherein the discriminator is configured to distinguish unlabeled data from labeled data; and
output, using the discriminator, one or more similarity metrics associated with the entries in the data set including the one or more similarity metrics associated with the one or more entries from the data set that are at or above the threshold, wherein the one or more similarity metrics indicate a similarity of the entries in the data set to the labeled data.

12. The electronic device of claim 11, wherein, to select the one or more entries from the data set based on the similarity between the one or more entries and the labeled data, the at least one processor is configured to:
determine that at least one similarity metric of the one or more similarity metrics associated with the one or more entries from the data set is below the threshold; and
label at least one entry of the one or more entries according to a manual labeling application.

13. The electronic device of claim 12, wherein, to label the at least one entry of the one or more entries according to the manual labeling application, the at least one processor is configured to:
request at least one label, wherein the requested at least one label includes one or more options for providing the at least one label;
receive at least one label input in response to the request for the at least one label; and
label the at least one entry of the one or more entries based on the at least one label input.

14. The electronic device of claim 8, wherein the at least one processor is further configured to:
determine an uncertainty score for at least one data sample from the unlabeled data; and
select the at least one data sample as a query sample for labeling based on the uncertainty score.

15. A non-transitory computer readable medium embodying a computer program for operating an electronic device including at least one processor, the computer program comprising computer readable instructions that, when executed by the at least one processor, cause the electronic device to:

map, using a feature encoder, entries in a data set including unlabeled data to a latent space;

select one or more entries from the data set including at least some of the unlabeled data based on a similarity between the one or more entries and labeled data, wherein the computer readable instructions that when executed cause the electronic device to select the one or more entries comprise computer readable instructions that when executed cause the electronic device to determine that one or more similarity metrics associated with the one or more entries from the data set are at or above a threshold; and label the one or more entries according to the similarity between the one or more entries and the labeled data.

16. The non-transitory computer readable medium of claim 15, wherein the computer program further comprises computer readable instructions that, when executed by the at least one processor, cause the electronic device to:

receive an unlabeled input; and store the unlabeled input into the data set based on a determination that a model fails to label the unlabeled input.

17. The non-transitory computer readable medium of claim 15, wherein the computer program further comprises computer readable instructions that, when executed by the at least one processor, cause the electronic device to:

update the labeled data with the one or more labeled entries; and cause a model to be further trained based on the updated labeled data.

18. The non-transitory computer readable medium of claim 15, wherein the computer program further comprises computer readable instructions that, when executed by the at least one processor, cause the electronic device to:

process, using a discriminator, the mapped entries in the data set, wherein the discriminator is configured to distinguish unlabeled data from labeled data; and output, using the discriminator, one or more similarity metrics associated with the entries in the data set including the one or more similarity metrics associated with the one or more entries from the data set that are at or above the threshold, wherein the one or more similarity metrics indicate a similarity of the entries in the data set to the labeled data.

19. The non-transitory computer readable medium of claim 18, wherein the computer readable instructions that, when executed by the at least one processor, cause the electronic device to select the one or more entries from the data set based on the similarity between the one or more entries and the labeled data comprise:

computer readable instructions that, when executed by the at least one processor, cause the electronic device to:

determine that at least one similarity metric of the one or more similarity metrics associated with the one or more entries from the data set is below the threshold; and label at least one entry of the one or more entries according to a manual labeling application.

20. The non-transitory computer readable medium of claim 19, wherein the computer readable instructions that, when executed by the at least one processor, cause the electronic device to label the at least one entry of the one or more entries according to the manual labeling application comprise:

computer readable instructions that, when executed by the at least one processor, cause the electronic device to:

request at least one label, wherein the requested at least one label includes one or more options for providing the at least one label;

receive at least one label input in response to the request for the at least one label; and label the at least one entry of the one or more entries based on the at least one label input.

21. The non-transitory computer readable medium of claim 15, wherein the computer program further comprises computer readable instructions that, when executed by the at least one processor, cause the electronic device to:

determine an uncertainty score for at least one data sample from the unlabeled data; and select the at least one data sample as a query sample for labeling based on the uncertainty score.

22. A method for training an active learning model, the method comprising:

receiving a data pool including labeled data and unlabeled data;

mapping, by a feature encoder, the labeled data and the unlabeled data to a latent space;

processing the mapped labeled data and the mapped unlabeled data by a discriminator, wherein the discriminator is configured to distinguish unlabeled data from labeled data;

minimizing a loss of the discriminator; and updating parameters of the discriminator based on the minimized loss.

23. The method of claim 22, further comprising:

inputting the mapped labeled data into a feature decoder; and predicting, by the feature decoder, at least one target output based on the mapped labeled data.

24. The method of claim 23, further comprising:

minimizing a loss of the feature encoder and the feature decoder;

updating parameters of the feature encoder based on the minimized loss; and updating parameters of the feature decoder based on the minimized loss.

25. The method of claim 22, wherein mapping the labeled data and the unlabeled data to the latent space encourages the discriminator to regard latent representations received by the discriminator as labeled.

* * * * *